United States Patent
MacNaughton et al.

(10) Patent No.: US 10,766,678 B2
(45) Date of Patent: Sep. 8, 2020

(54) CABLE TIE

(71) Applicant: Tyco Electronics UK Ltd., Swindon (GB)

(72) Inventors: Roy MacNaughton, Swindon (GB); Jonathan Mark Eyles, Swindon (GB); Philip Hammond, Swindon (GB)

(73) Assignee: Tyco Electronics UK Ltd., Swindon (GB)

(*) Notice: Subject to any disclaimer, the term of this patent is extended or adjusted under 35 U.S.C. 154(b) by 91 days.

(21) Appl. No.: 16/109,904

(22) Filed: Aug. 23, 2018

(65) Prior Publication Data

US 2018/0362231 A1    Dec. 20, 2018

Related U.S. Application Data

(63) Continuation of application No. PCT/EP2017/054398, filed on Feb. 24, 2017.

(30) Foreign Application Priority Data

Feb. 24, 2016 (EP) ..................... 16157060

(51) Int. Cl.
*B65D 63/10* (2006.01)
*F16L 3/137* (2006.01)

(52) U.S. Cl.
CPC .......... *B65D 63/1072* (2013.01); *F16L 3/137* (2013.01); *B65D 2563/101* (2013.01)

(58) Field of Classification Search
CPC ............ B65D 63/1072; B65D 63/1063; B65D 2563/101; Y10T 24/1498
See application file for complete search history.

(56) References Cited

U.S. PATENT DOCUMENTS 3,300,825 A * 1/1967 Andreasen .............. F16L 3/137
24/16 PB
2002/0083559 A1 7/2002 Hatch

FOREIGN PATENT DOCUMENTS

| DE | 102009038337 A1 | 2/2011 |
|---|---|---|
| EP | 1818275 A1 | 8/2007 |
| GB | 2108572 A | 5/1983 |
| WO | WO 2015/195883 A1 | 12/2015 |

OTHER PUBLICATIONS

PCT Notification, International Search Report and Written Opinion of the International Searching Authority, dated May 9, 2017, 12 pages.
Abstract of DE102009038337, dated Feb. 24, 2011, 1 page.
EP Communication issued in co-pending application, dated Mar. 3, 2020, 5 pages.

* cited by examiner

*Primary Examiner* — Robert Sandy
(74) *Attorney, Agent, or Firm* — Barley Snyder

(57) ABSTRACT

A cable tie includes a belt, a head connected to the belt and having a passageway for receiving the belt, and a lock disposed in the head. The lock is displaceable parallel to a plane of the passageway along a stroke and has a protrusion configured to lock the belt.

30 Claims, 26 Drawing Sheets

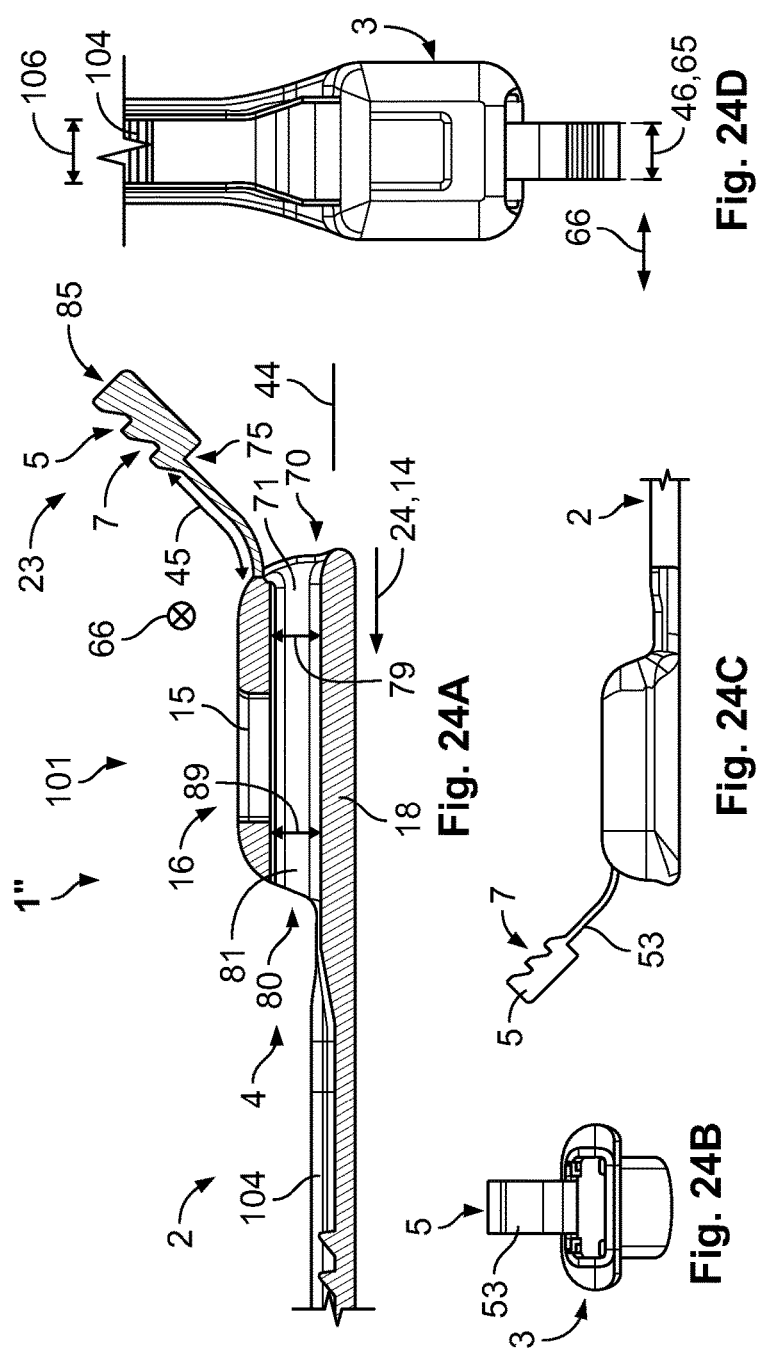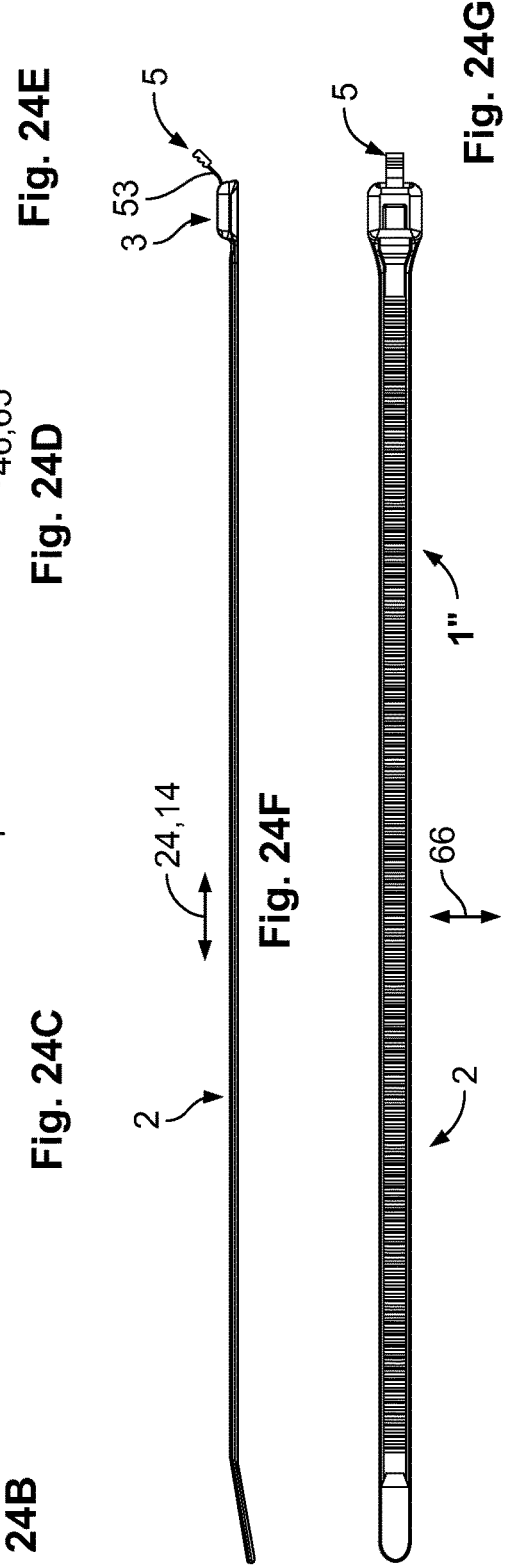

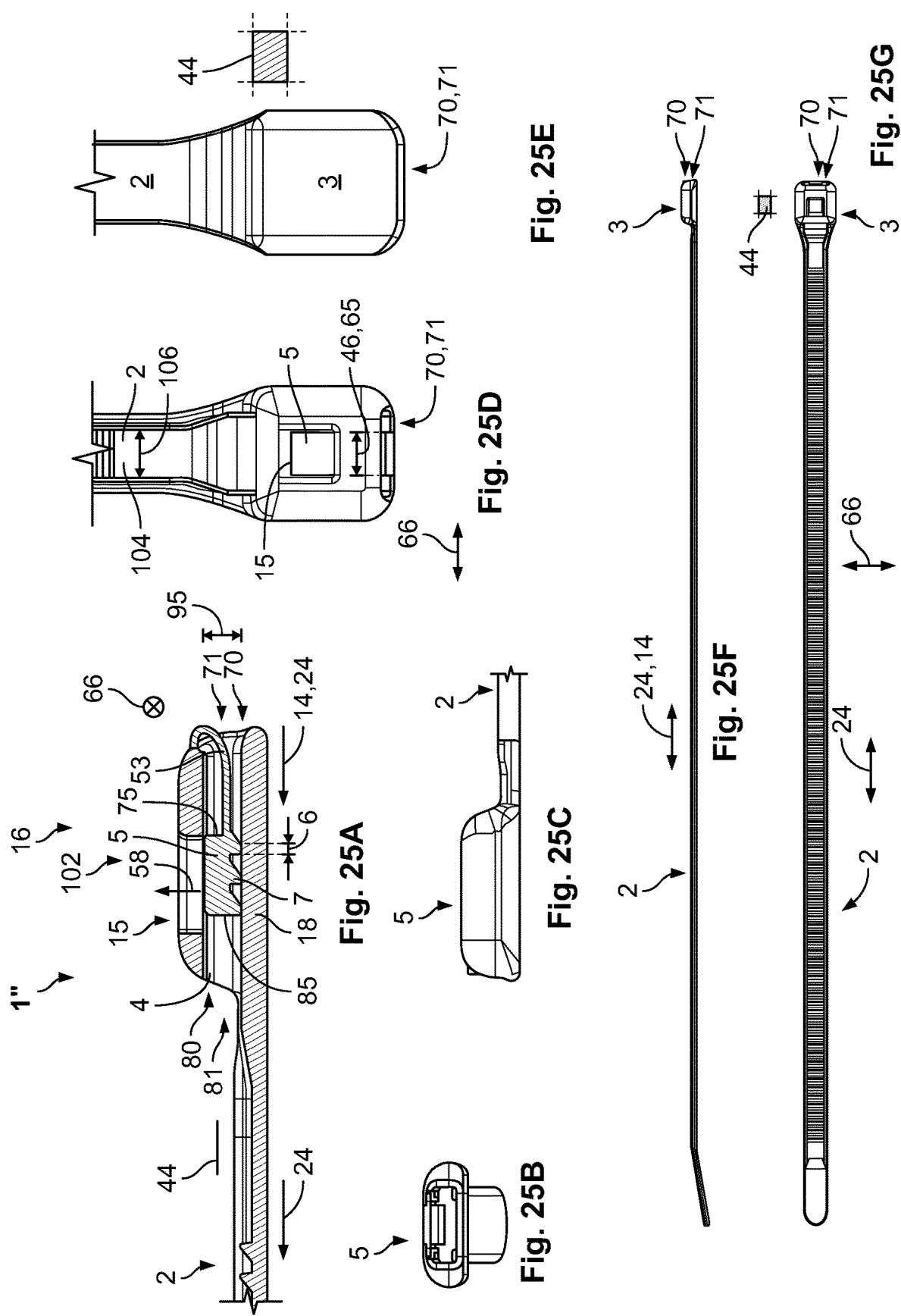

US 10,766,678 B2

CABLE TIE

CROSS-REFERENCE TO RELATED APPLICATIONS

This application is a continuation of PCT International Application No. PCT/EP2017/054398, filed on Feb. 24, 2017, which claims priority under 35 U.S.C. § 119 to European Patent Application No. 16157060.1, filed on Feb. 24, 2016.

FIELD OF THE INVENTION

The present invention relates to a cable tie.

BACKGROUND

Cable ties are used for fixing cables to structures or for attaching several cables to each other. Cable ties are also used for fixing pipes such as air ducts to brackets and for attaching bellows and sleeves to pipes or ducts. Known cable ties, however, are large and have heads which can cause damage to adjacent substrates or can snag on adjacent structures.

SUMMARY

A cable tie comprises a belt, a head connected to the belt and having a passageway for receiving the belt, and a lock disposed in the head. The lock is displaceable parallel to a plane of the passageway along a stroke and has a protrusion configured to lock the belt.

BRIEF DESCRIPTION OF THE DRAWINGS

The invention will now be described by way of example with reference to the accompanying Figures, of which:

FIG. 24A is a sectional side view of a head of the cable tie of FIG. 23A;
FIG. 24B is a front view of the head of the cable tie of FIG. 23A;
FIG. 24C is a side view of the head of the cable tie of FIG. 23A;
FIG. 24D is a top view of the head of the cable tie of FIG. 23A;
FIG. 24E is a bottom view of the head of the cable tie of FIG. 23A;
FIG. 24F is a side view of the cable tie of FIG. 23A;
FIG. 24G is a top view of the cable tie of FIG. 23A;
FIG. 25A is a sectional side view of the head of the cable tie of FIG. 23B;
FIG. 25B is a front view of the head of the cable tie of FIG. 23B;
FIG. 25C is a side view of the head of the cable tie of FIG. 23B;
FIG. 25D is a top view of the head of the cable tie of FIG. 23B;
FIG. 25E is a bottom view of the head of the cable tie of FIG. 23B;
FIG. 25F is a side view of the cable tie of FIG. 23B;
FIG. 25G is a top view of the cable tie of FIG. 23B.

DETAILED DESCRIPTION OF THE EMBODIMENT(S)

Figure 1:
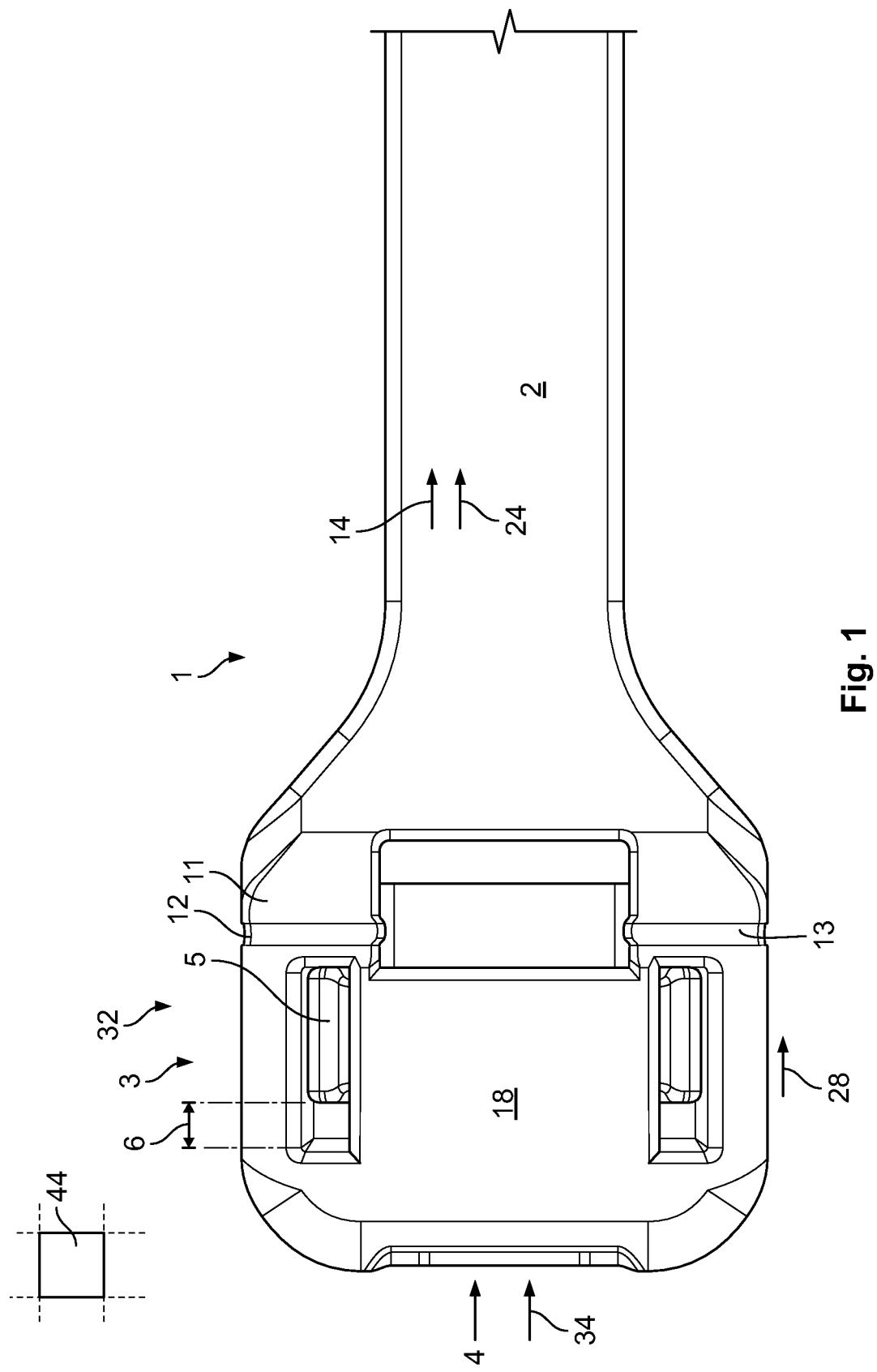
FIG. 1 is a bottom view of a cable tie according to a first embodiment of the invention.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will be thorough and complete and will fully convey the concept of the disclosure to those skilled in the art.

A cable tie 1 according to a first embodiment of the invention is shown in FIGS. 1-7. As shown in FIG. 1, the cable tie 1 comprises a belt 2 and a head 3 connected to the belt 2.

Figure 2:
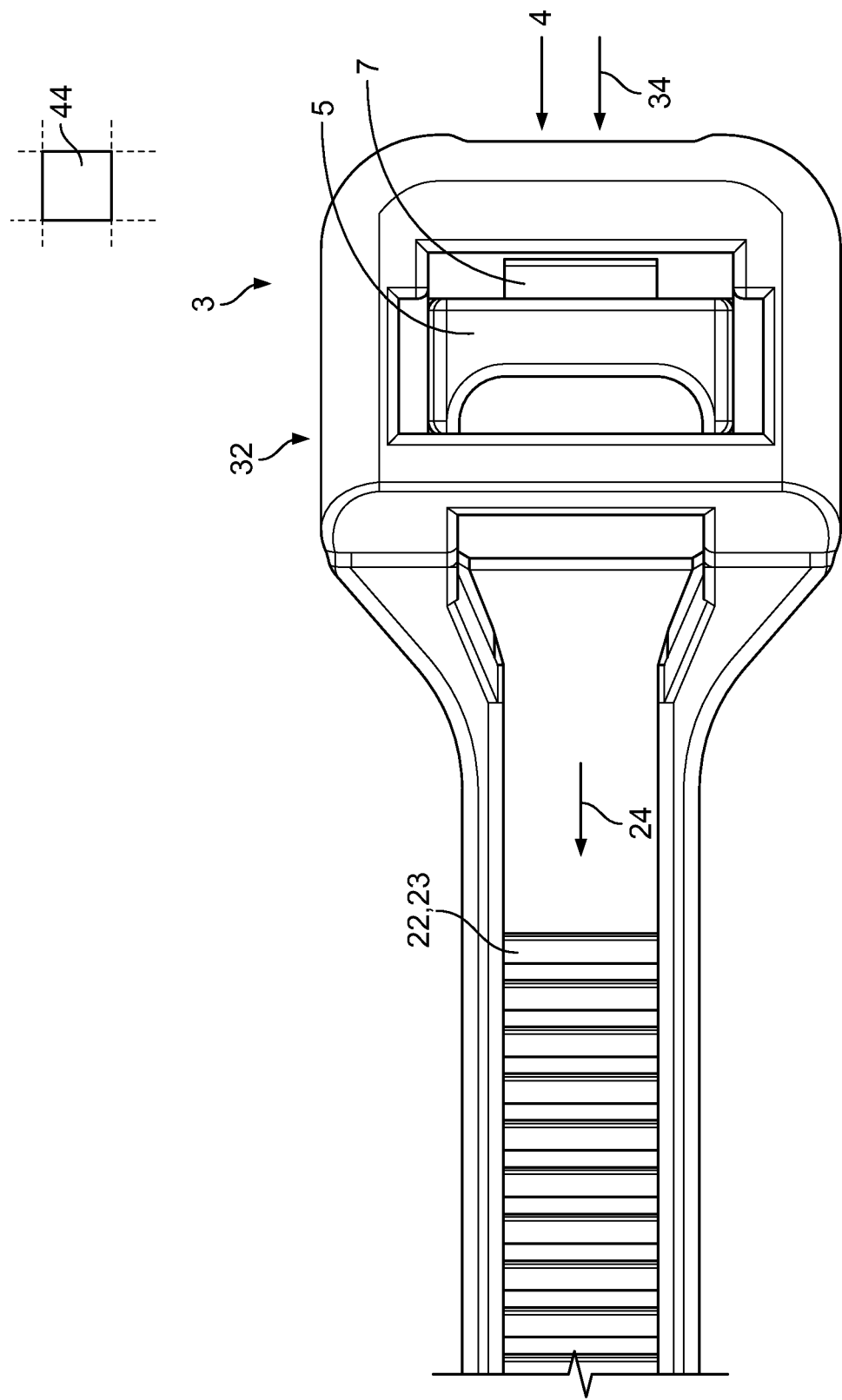
FIG. 2 is a top view of the cable tie of FIG. 1.
Figure 3:
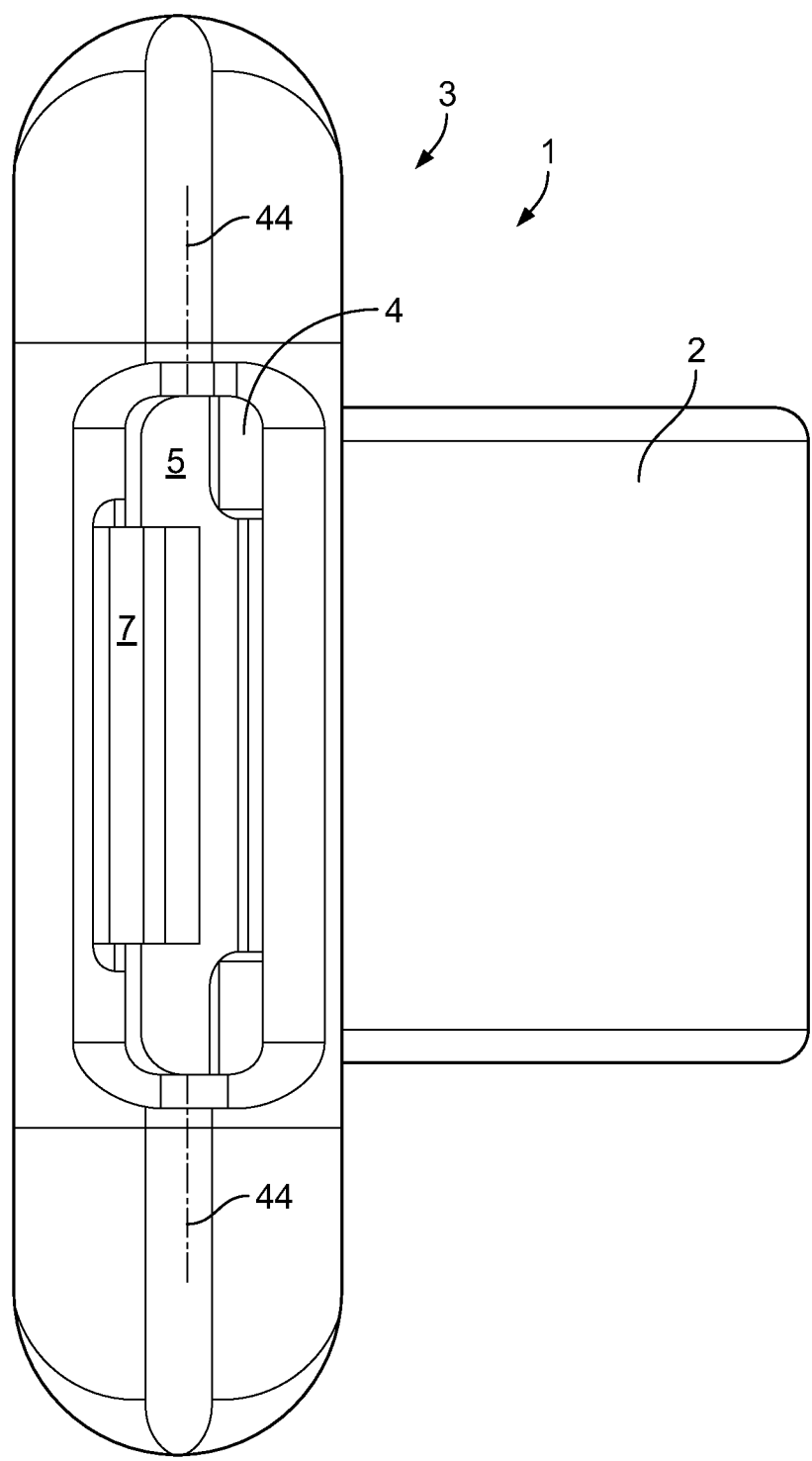
FIG. 3 is a front view of the cable tie of FIG. 1.

The head 3, as shown in FIGS. 1-3, has a passageway 4 receiving the belt 2. A thickness 8 of the head 3 is less than three times a thickness 9 of the belt 2, as shown in FIG. 5, so that the entire cable tie 1 is very flat and compact.

Figure 4:
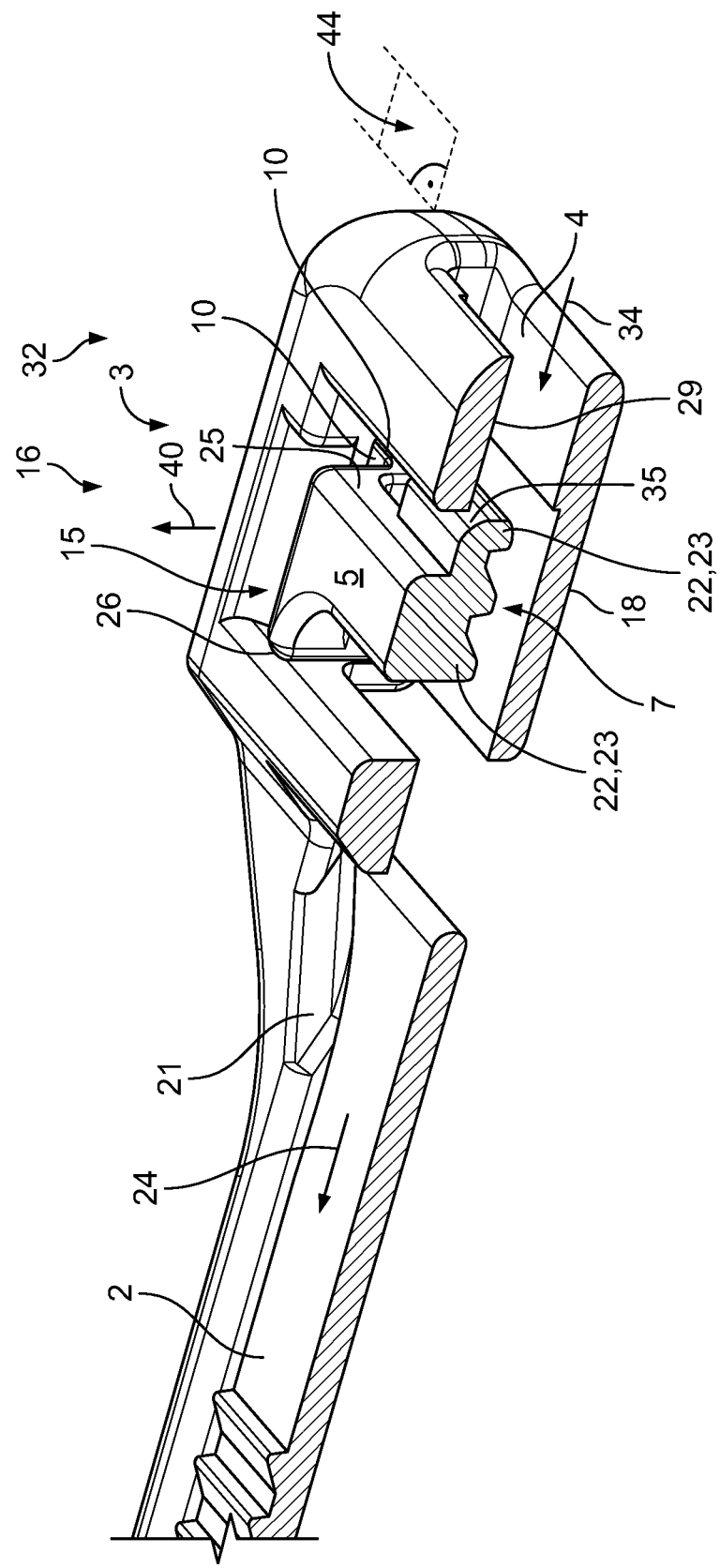
FIG. 4 is a sectional perspective view of the cable tie of FIG. 1.

A lock 5 is disposed in the head 3 and is displaceable in a plane 44 of the passageway 4 along a stroke 6. The stroke 6 is parallel to a belt insertion direction 34 of the passageway 4 to allow a compact design. The head 3 comprises a top opening 15 and the lock 5 is accessible from a top side 16, as shown in FIG. 4. This keeps the construction flat as no covering on the top side 16 is necessary. Further, in some embodiments, the lock 5 can be inserted into the head 3 through the top opening 15.

Figure 6:
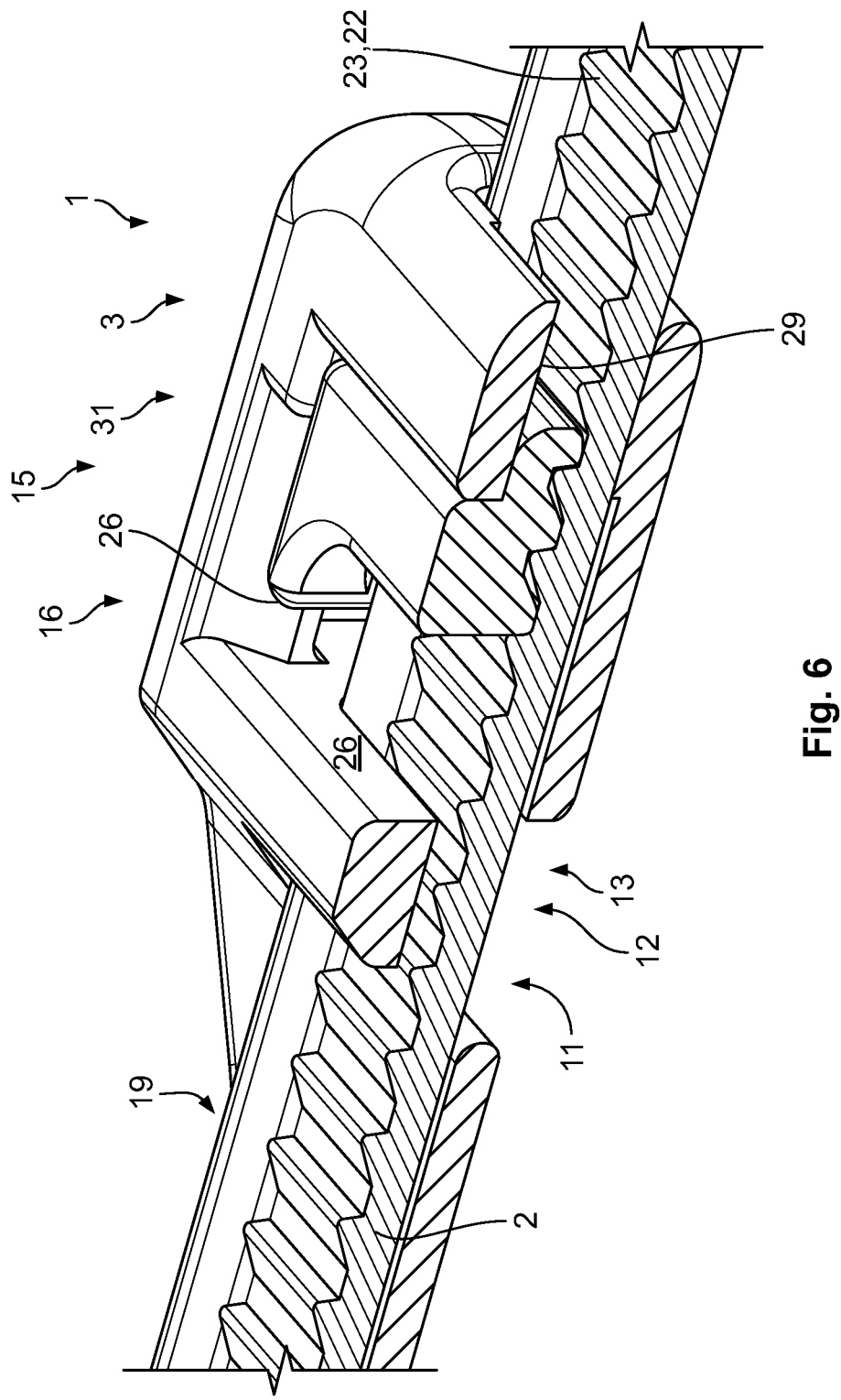
FIG. 6 is a sectional perspective view of the cable tie of FIG. 1.

The head 3, as shown in FIG. 1, has a base plate 18 that protects and supports the belt 2 opposite the side on which the lock 5 is located. The belt 2 is located between the lock 5 and the base plate 18. The lock 5 and the belt 2, as shown in FIG. 6, comprise guiding faces 19 for guiding the belt 2 along the lock 5.

Figure 5:
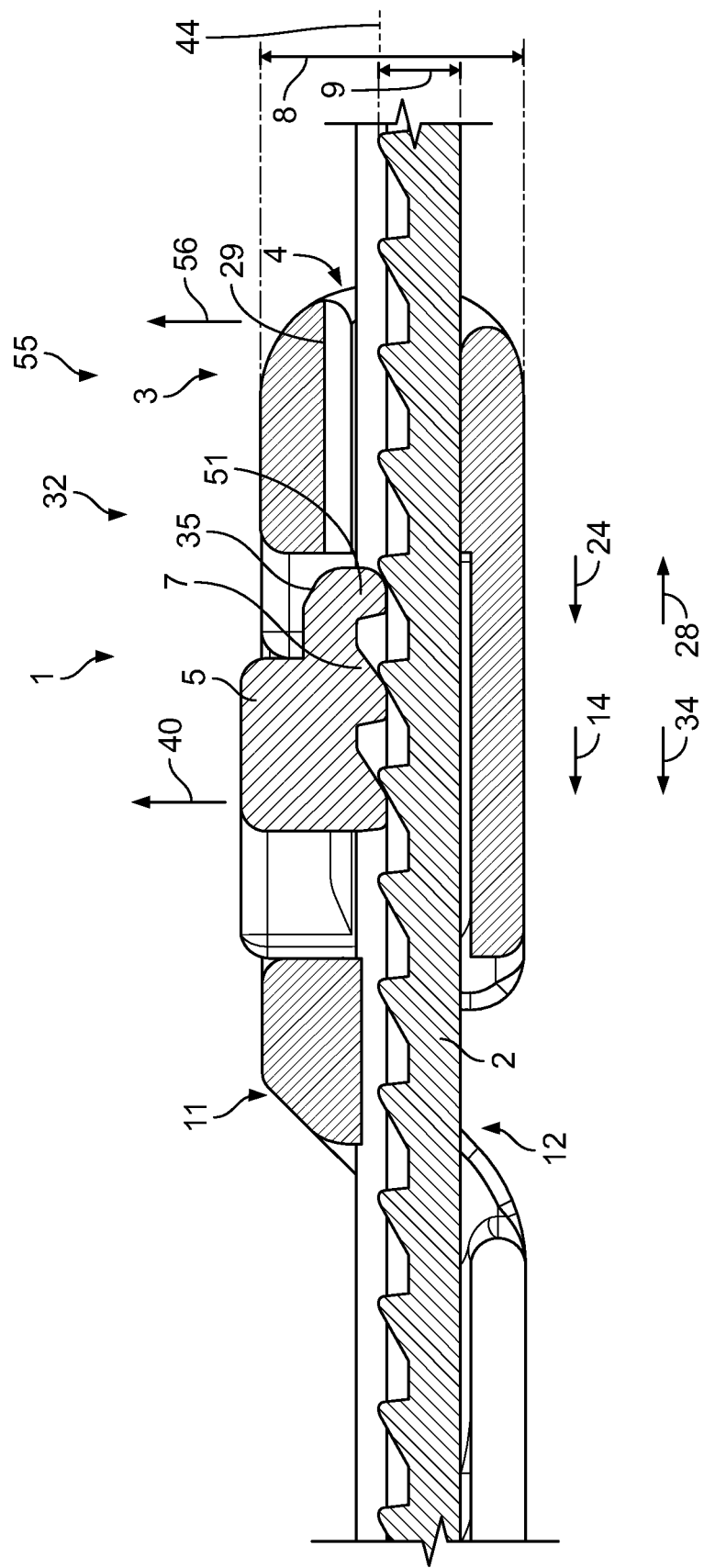
FIG. 5 is a sectional side view of the cable tie of FIG. 1.

The lock 5 has several protrusions 7 configured to engage and lock the belt 2, as shown in FIG. 5. In the shown embodiment, the lock 5 is translationally displaceable along a tightening direction 14, a belt direction 24 or a belt insertion direction 34 along which the belt 2 is inserted into the passageway 4, as shown in FIG. 5. The tightening direction 14 extends parallel to the belt direction 24 and the belt insertion direction 34. In other embodiments, the displaceability of the lock 5 could be perpendicular to these directions 14, 24, 34 but still in the plane 44.

To use the cable tie 1, the belt 2 is inserted along the belt insertion direction 34 into the passageway 4 while the lock 5 is in an unlocked position 32 and is then tightened by pulling on a free end of the belt 2, as shown in FIGS. 4 and 5. Once tightening is no longer possible, the lock 5 engages the belt 2, and the belt 2 pulls the lock 5 in a locking direction 28. The tightening direction 14 extends counter to a locking direction 28 of a locking motion by which the belt 2 is locked in the head 3. The lock 5 is then movable into a locked position 31 shown in FIGS. 6 and 7 engaging the belt 2.

In the locked position 31, protrusions 7 of the lock 5 that are configured as positive locking elements 22 or teeth 23 engage with corresponding positive locking elements 22 or teeth 23 on the belt 2. The engagement of the protrusions 7 with the teeth 23 of the belt 2 prevents a movement of the belt 2 against the tightening direction 14. In the shown embodiment, the teeth 23 are ramps with a slightly inclined first face for a smooth guiding and a steep second face for achieving a positive fit. In the shown embodiment, each of the positive locking elements 22 has three teeth 23 to increase a holding force. The stroke 6 is smaller than a pitch 17 between two teeth 23, shown in FIG. 7, to minimize the backlash.

Figure 7:
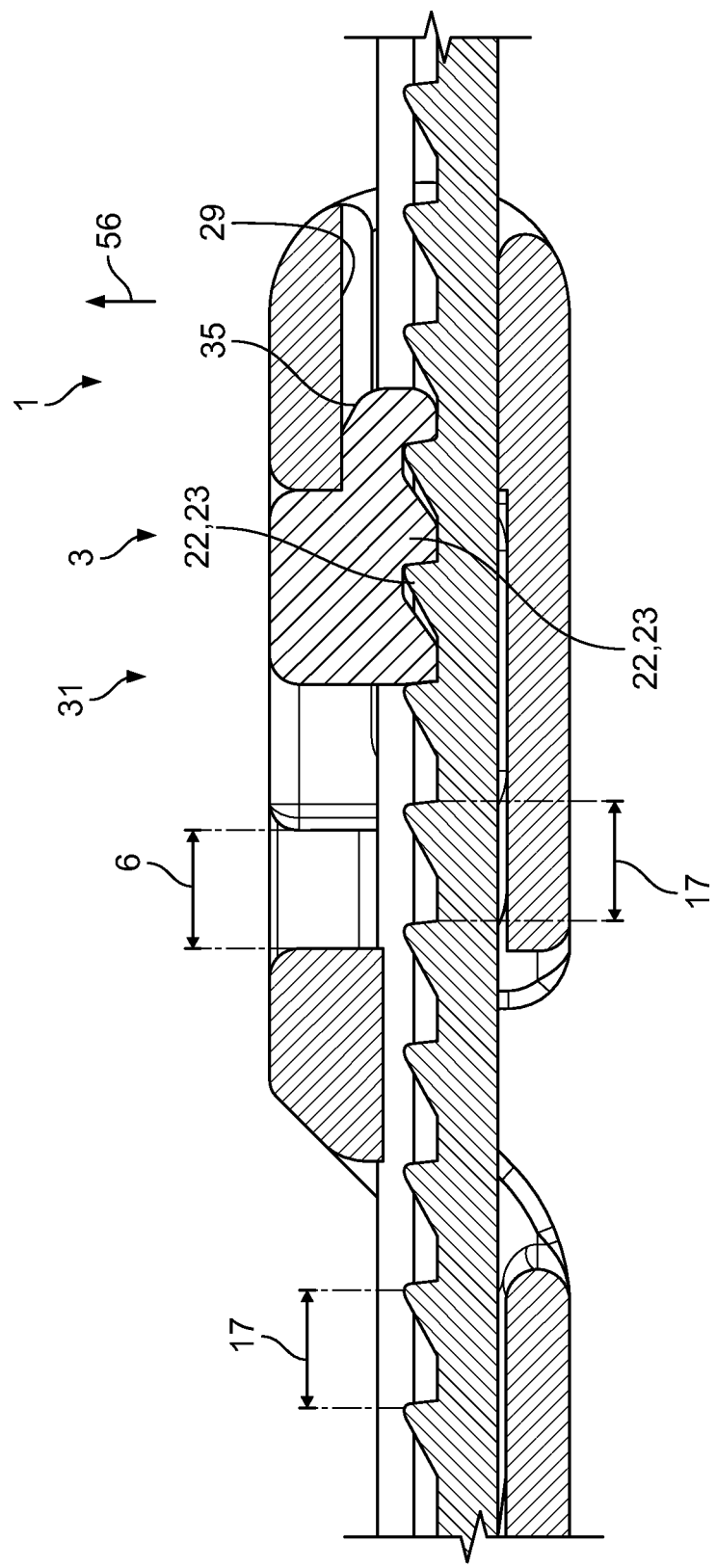
FIG. 7 is a sectional side view of the cable tie of FIG. 1.
Figure 8:
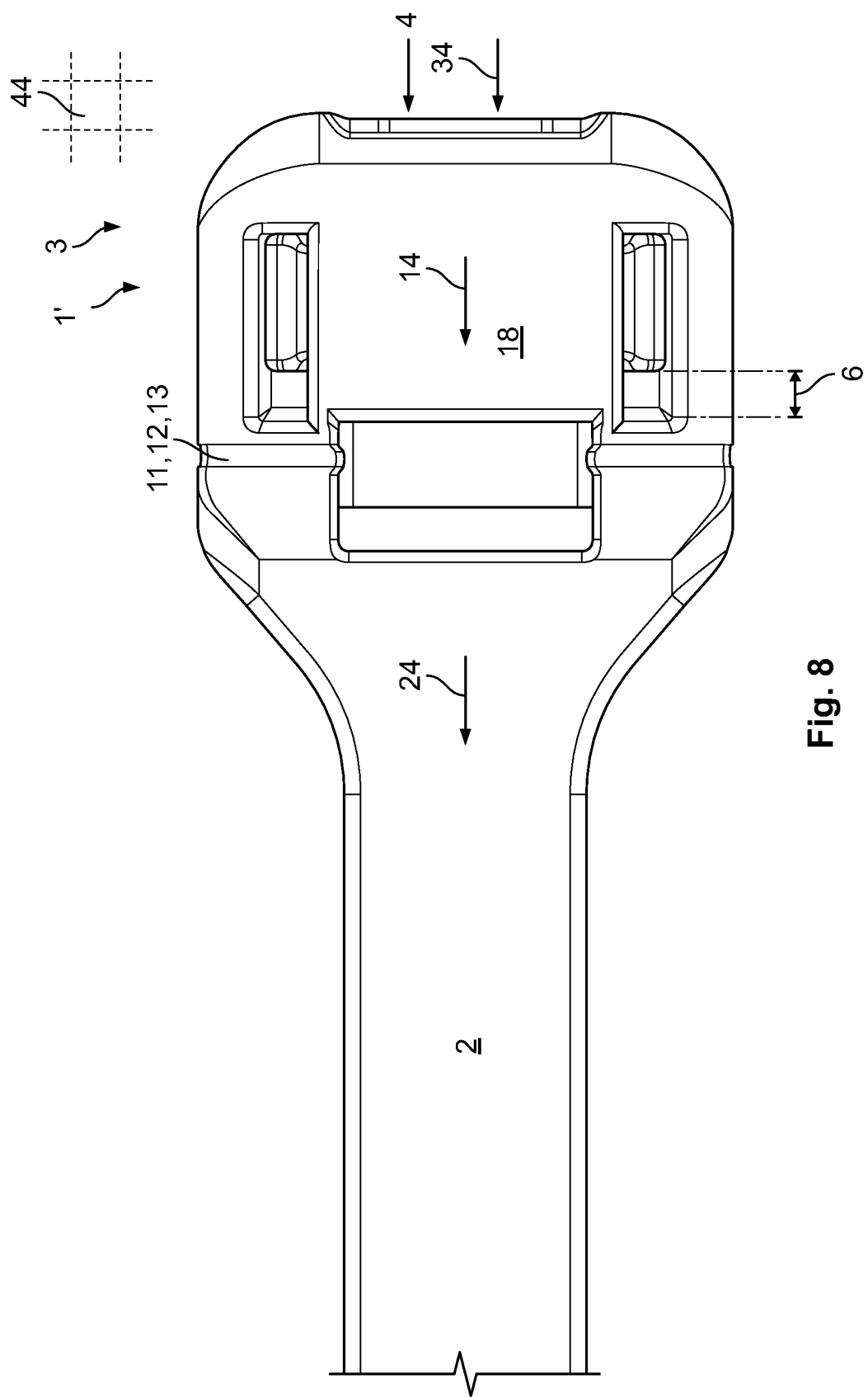
FIG. 8 is a bottom view of a cable tie according to another embodiment of the invention.
Figure 9:
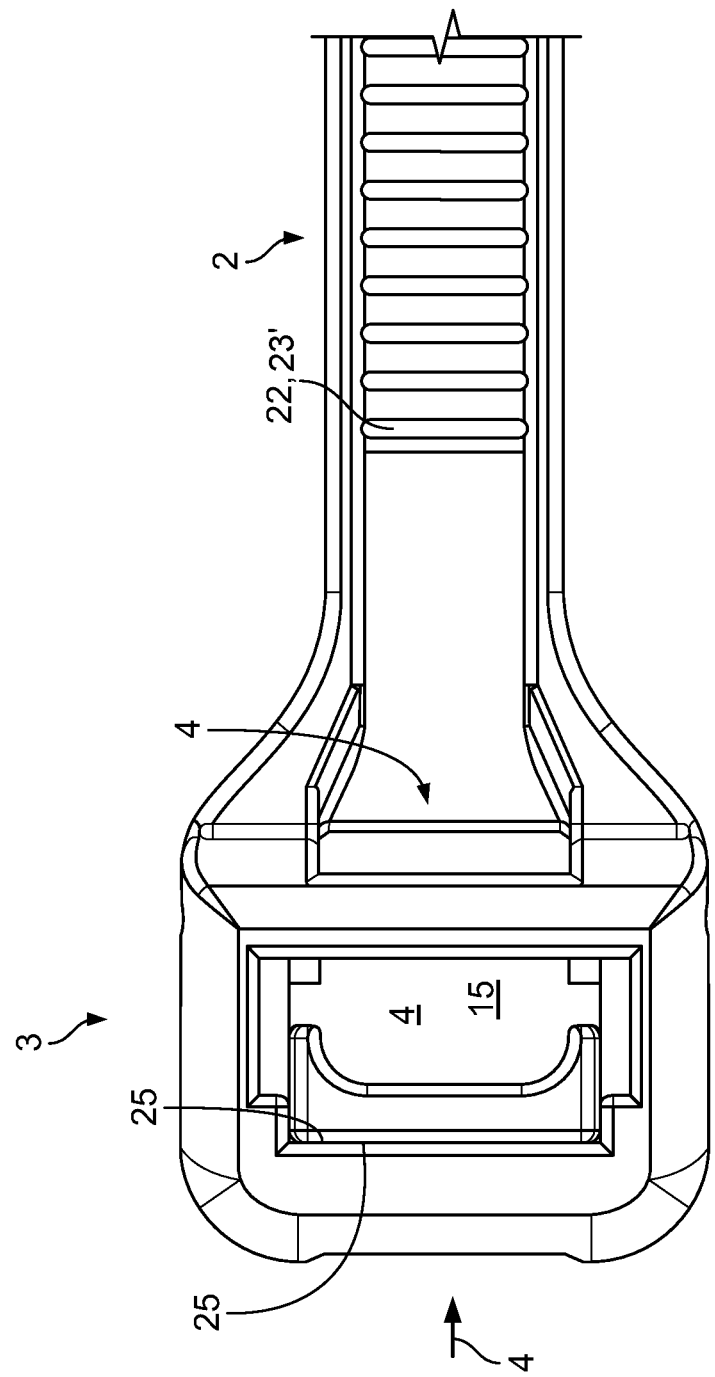
FIG. 9 is a top view of the cable tie of FIG. 8.
Figure 10:
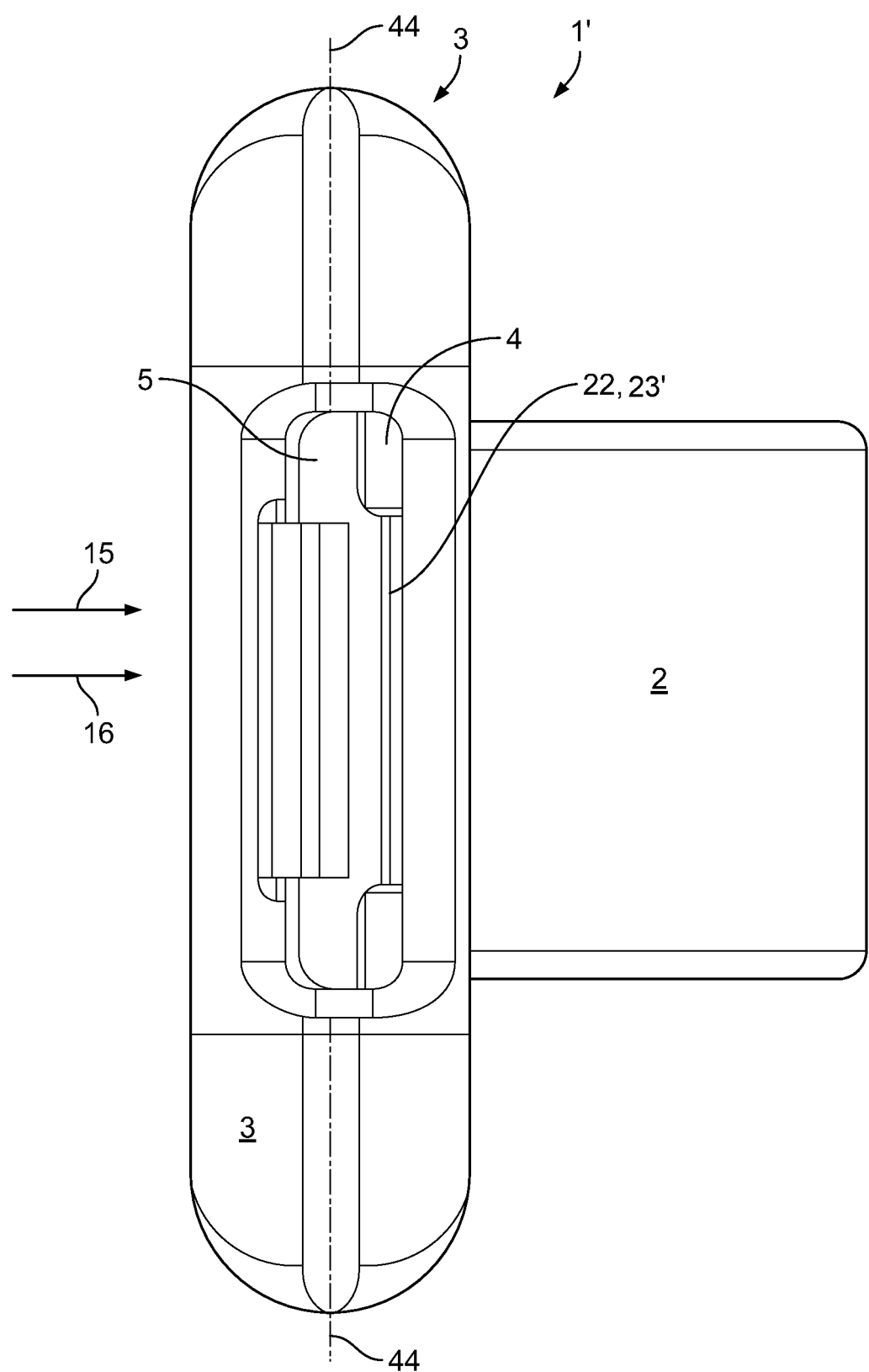
FIG. 10 is a front view of the cable tie of FIG. 8.
Figure 11:
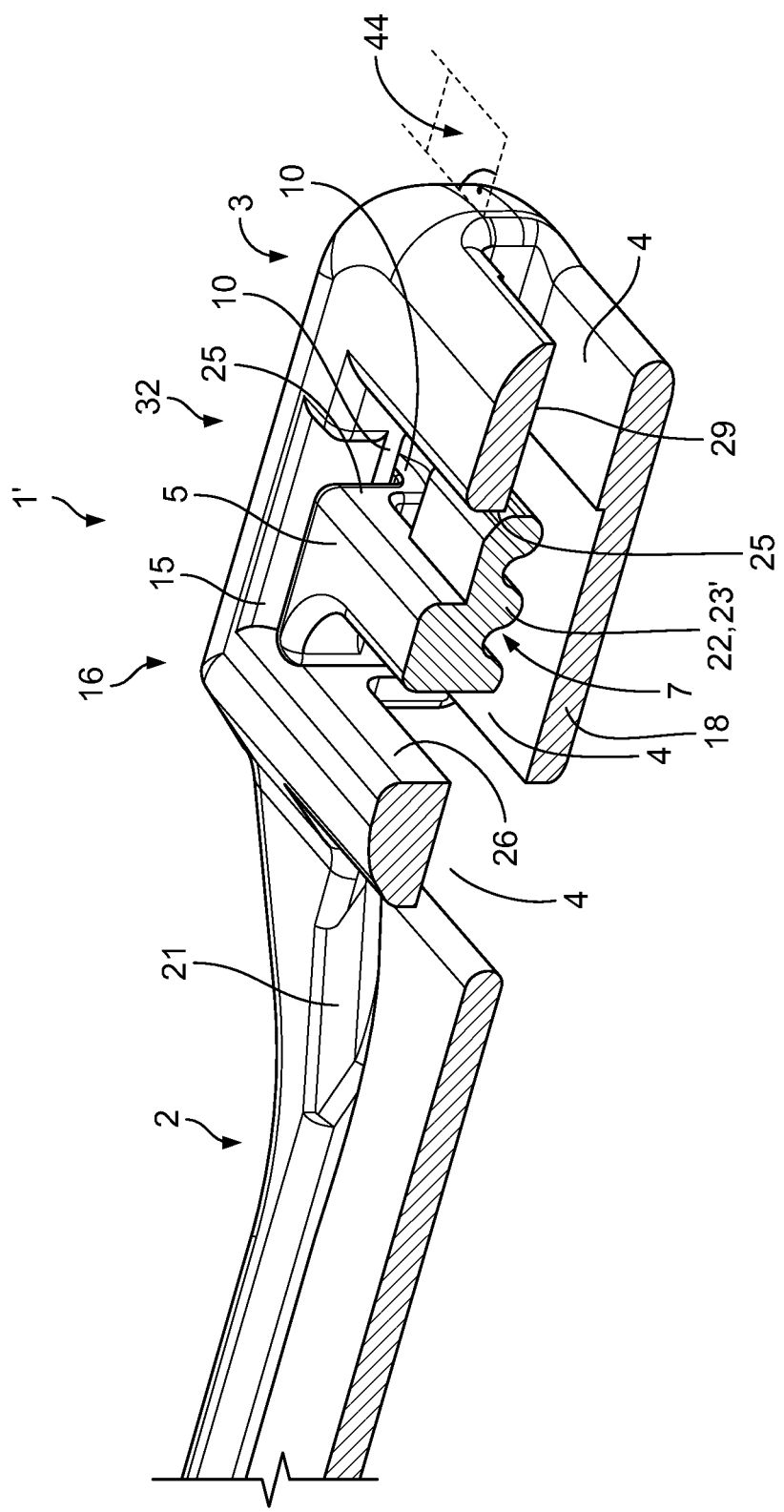
FIG. 11 is a sectional perspective view of the cable tie of FIG. 8.
Figure 12:
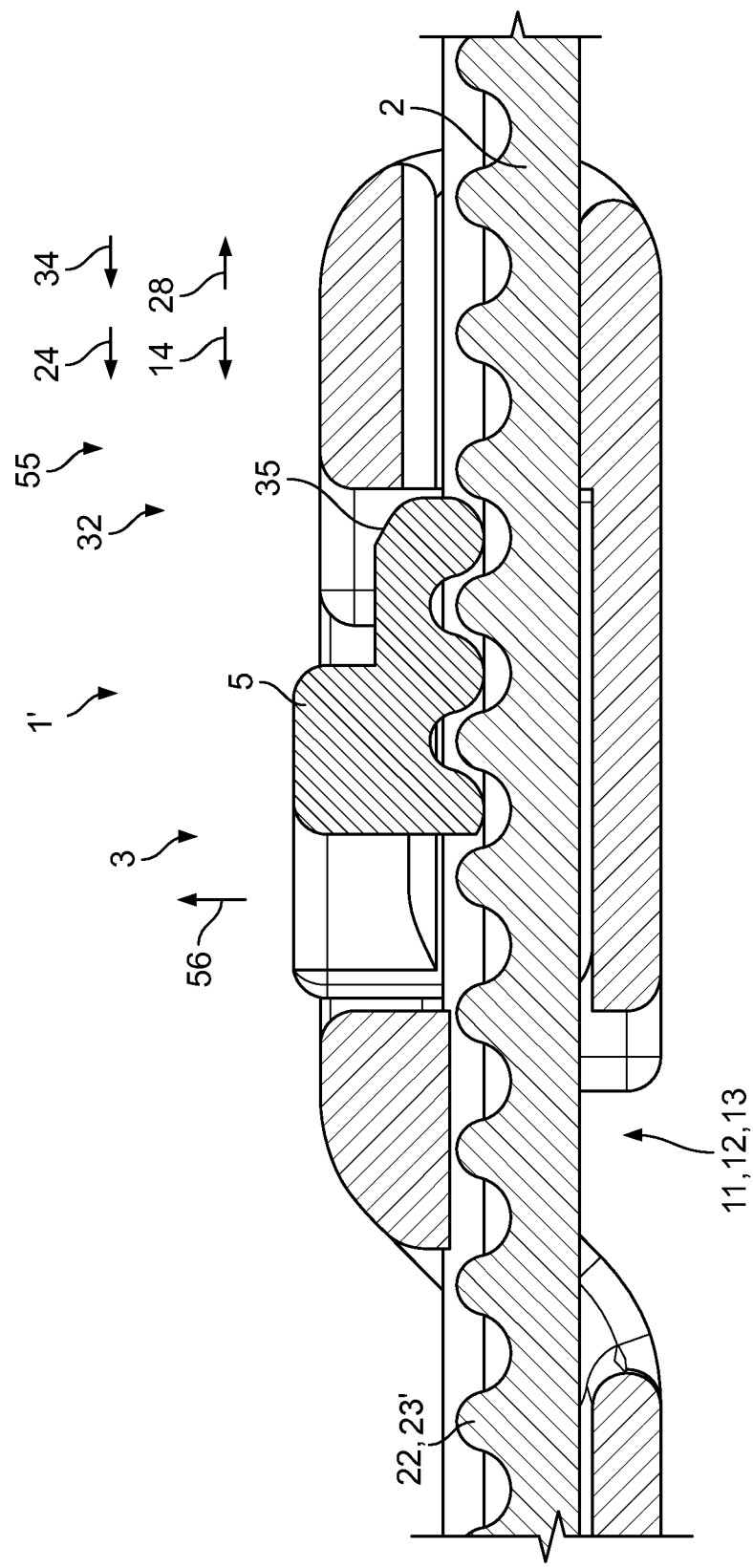
FIG. 12 is a sectional side view of the cable tie of FIG. 8.
Figure 13:
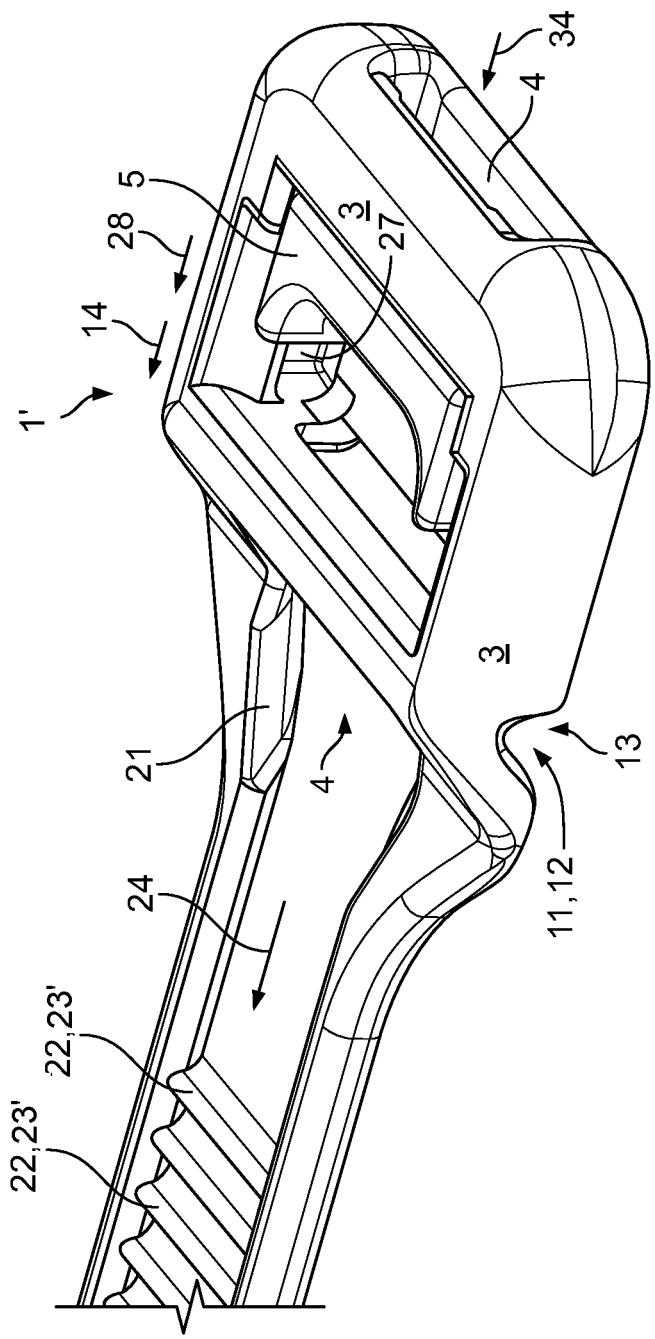
FIG. 13 is a perspective view of the cable tie of FIG. 8.

Due to an inclined face 35 of the lock 5, shown in FIG. 7, the lock 5 partially slides under the inner top face 29 of the head 3, as shown in FIGS. 6 and 7. The lock 5, in particular an extension 51 of the lock 5, is pulled into the passageway 4 and a positive fit between the protrusions 7 of the lock 5 and the positive fit elements 22 of the belt 2 is automatically achieved. The belt 2 is thus locked relative to the lock 5 and the head 3. The head 3 and the lock 5 each respective have a latch 10 with which the two are connected and latched to each other. An accidental loss is thus avoided.

In the unlocked position 32, the lock 5 is movable beyond the inner top face 29 in an upward direction 40 that extends perpendicular to the tightening direction 14. The belt 2 is then released from engagement with the lock 5 and the belt 2 can then be tightened in the tightening direction 14. The cable tie 1 further comprises an inclined output section 21 at an output end of the passageway 4, shown in FIG. 4, which allows a smooth exiting of the belt 2 from the head 3. In a force free position 55, such as the unlocked position 32 shown for example in FIG. 5, the belt 2 and the lock 5 overlap at least partially in a direction 56 perpendicular to the belt direction 24.

The lock 5 and the head 3, as shown in FIGS. 4 and 6, each has respective stop faces 25 and counter stop faces 26. The stop faces 25 and counter stop faces 26 are perpendicular to the tightening direction 14. The stop faces 25 stop movement of the lock 5 relative to the head 3 in the locking direction 28. The counter stop faces 26 stop movement of the lock 5 relative to the head 3 in the tightening direction 14.

The cable tie 1, as shown in FIGS. 1, 5, and 6, also has a hinge 11 with a weakened region 12. The weakened region 12 has a higher flexibility than the neighboring regions and allows a flexing or bending of the cable tie 1. In the shown embodiment, the weakened region 12 is a channel 13 extending perpendicular to the tightening direction 14.

The lock 5 and the head 3 can be made from different materials, for example from materials with a different hardness. The lock 5 can, for example, be harder in order to achieve a safe positive fit, while the head 3 is softer and cheaper.

Figure 19:
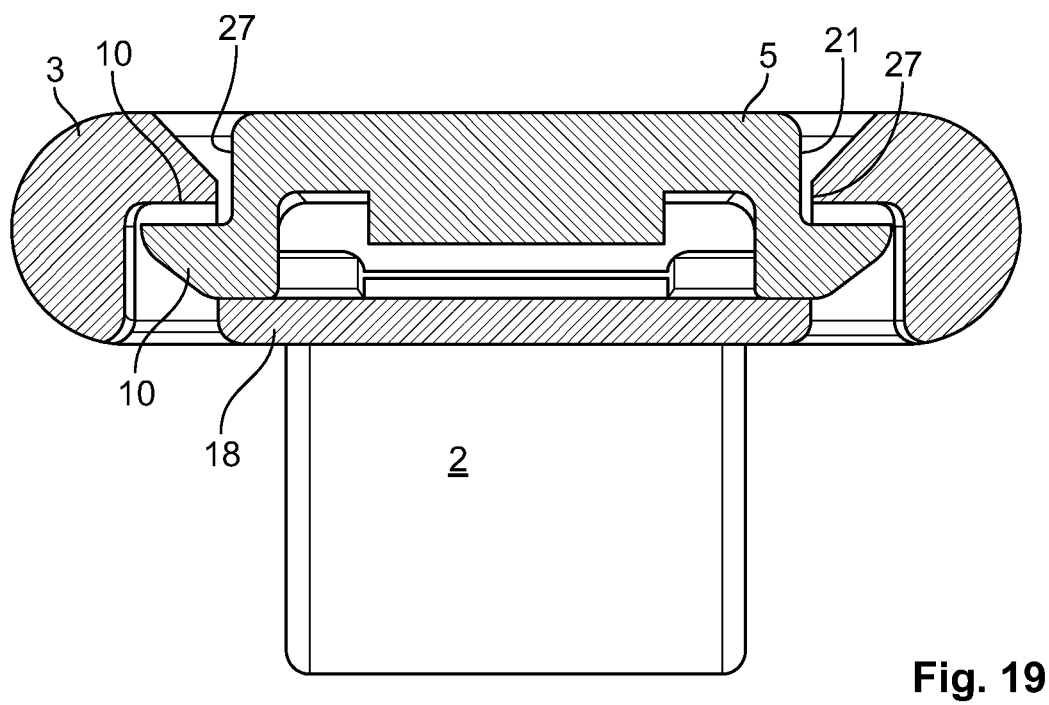
FIG. 19 is a sectional front view of an assembled position of the cable tie of FIG. 1.
Figure 20A:
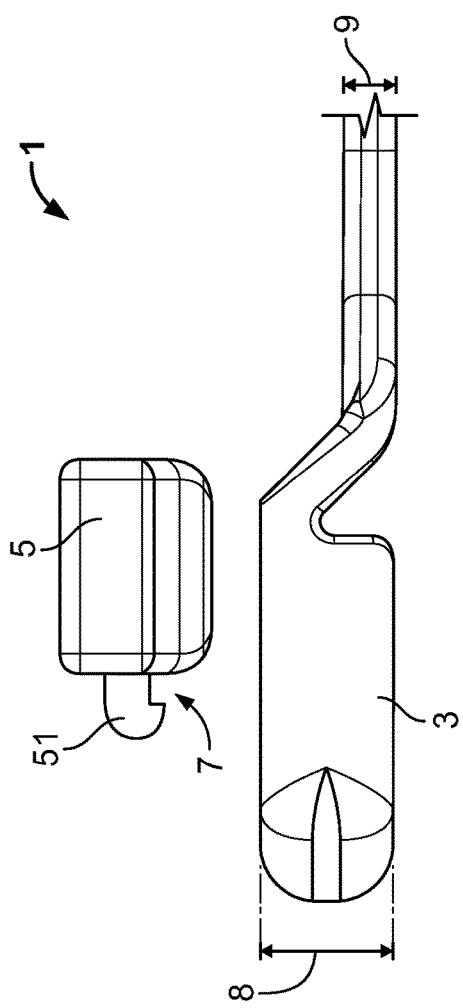
FIG. 20A is a side view of the pre-assembly position of the cable tie of FIG. 1.
Figure 20B:
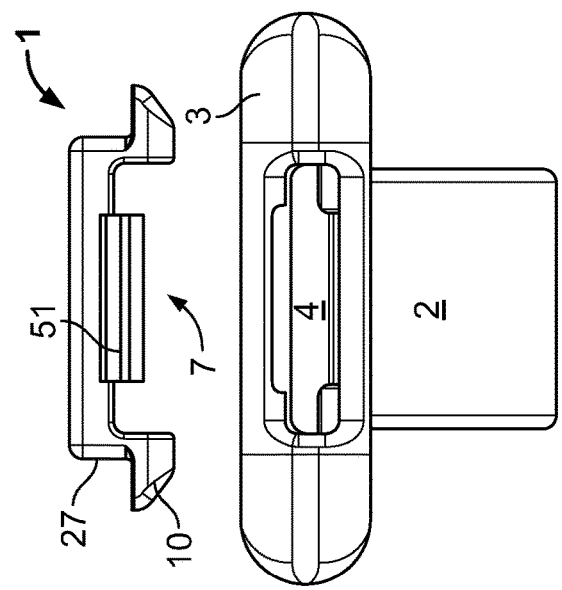
FIG. 20B is a front view of the pre-assembly position of the cable tie of FIG. 1.
Figure 20C:
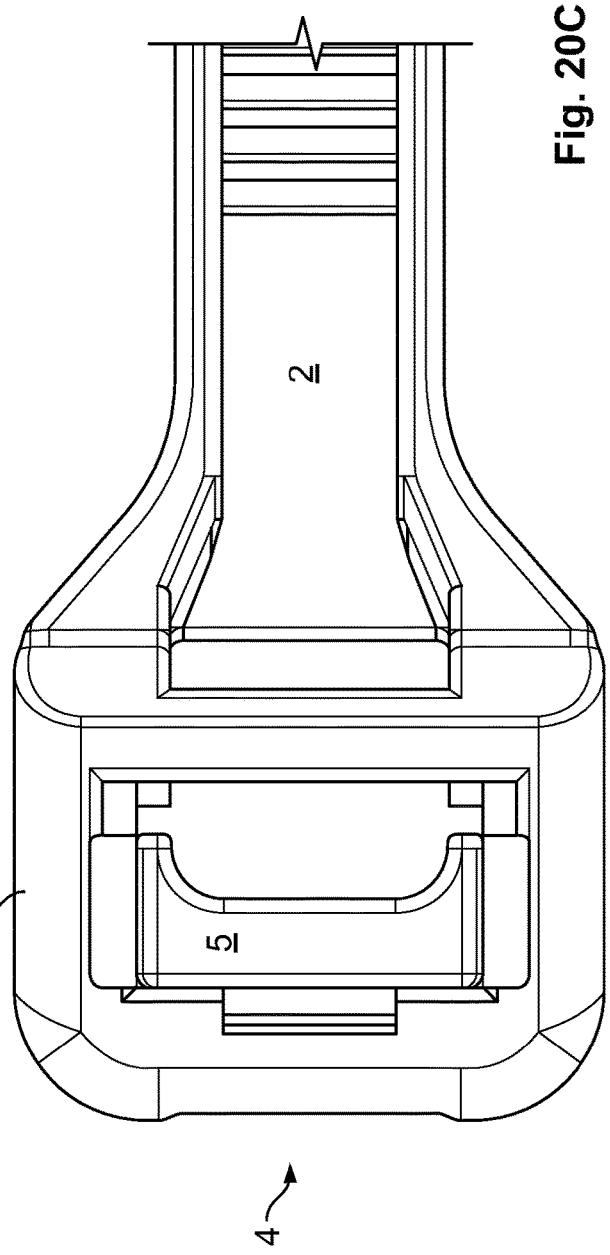
FIG. 20C is a top view of the pre-assembly position of the cable tie of FIG. 1.
Figure 21A:
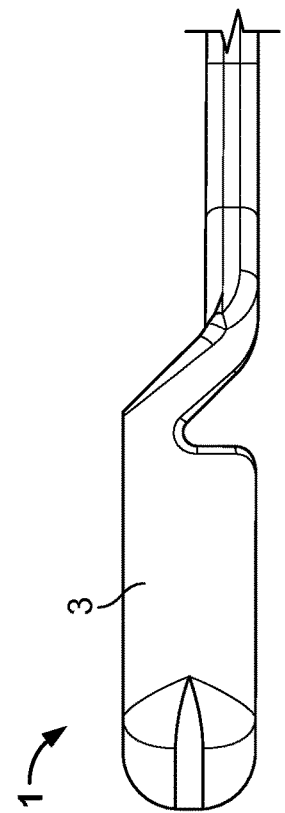
FIG. 21A is a side view of the assembly position of the cable tie of FIG. 1.
Figure 21B:
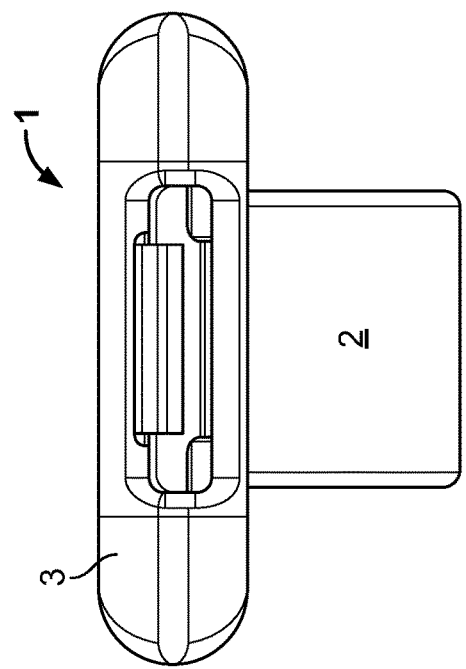
FIG. 21B is a front view of the assembly position of the cable tie of FIG. 1.
Figure 21C:
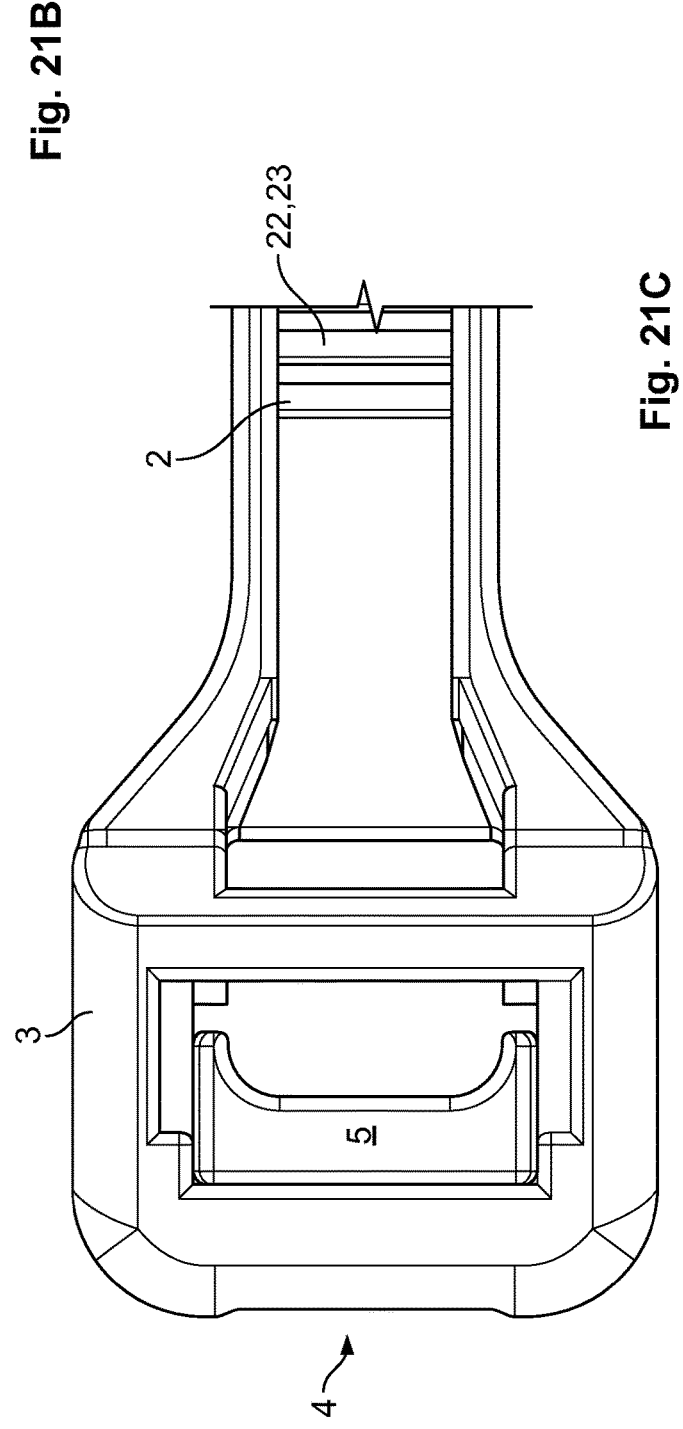
FIG. 21C is a top view of the assembly position of the cable tie of FIG. 1.

In the embodiment shown, the lock 5 and the head 3 are separate elements. In FIGS. 16-18 and 20A, B, C, the cable tie 1 is shown in a preassembled position in which the lock 5 is not yet inserted into the head 3. In particular, latches 10 with which the lock 5 is latched to the head 3 are visible. Guides 27 for guiding the lock 5 inside the head 3 are also shown. The guides 27 can be flat surfaces or rails which guide the lock 5 relative to the head 3 along the tightening direction 14, preventing jamming or tilting of the lock 5 relative to the head 3. An assembled position of the cable tie 1 in which the lock 5 is inserted into the head 3 and held by the latches 10 is shown in FIG. 19. The assembled positioned of the cable tie 1 is also shown in FIGS. 21 A, B, C.

In an embodiment in which the lock 5 and the head 3 are separate elements, the lock 5 and the head 3 can be made from different materials. For example, the lock 5 can be made from a harder or tougher material to allow higher forces to be used. The head 3 can be made from a less tough or softer material and thus be produced at lower costs. In an exemplary embodiment, the head 3 can be made from a plastic material in the molding operation and the lock 5 can be made from metal in a more complicated production operation.

Alternatively, the head 3 and lock 5 can also be integrally formed with each other and for example be connected by a material bridge. Such an embodiment is easy to manufacture and the lock 5 cannot be separated from the head 3. Similarly, the head 3 and the belt 2, which are integral in the shown embodiment, can also be separate elements that are only connected to each other.

Figure 22:
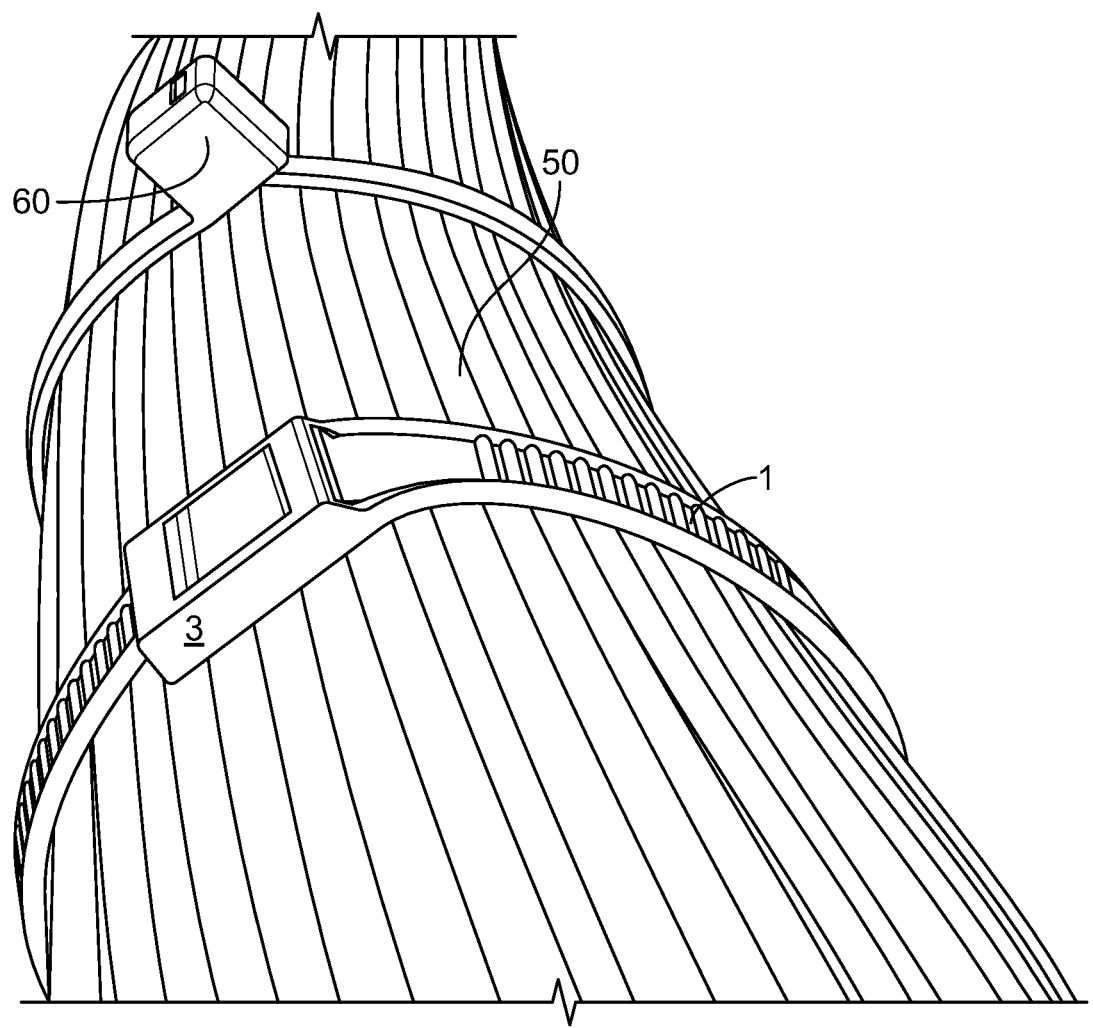
FIG. 22 is a perspective view of the cable tie of FIG. 1 and a plurality of cables.
Figure 23A:
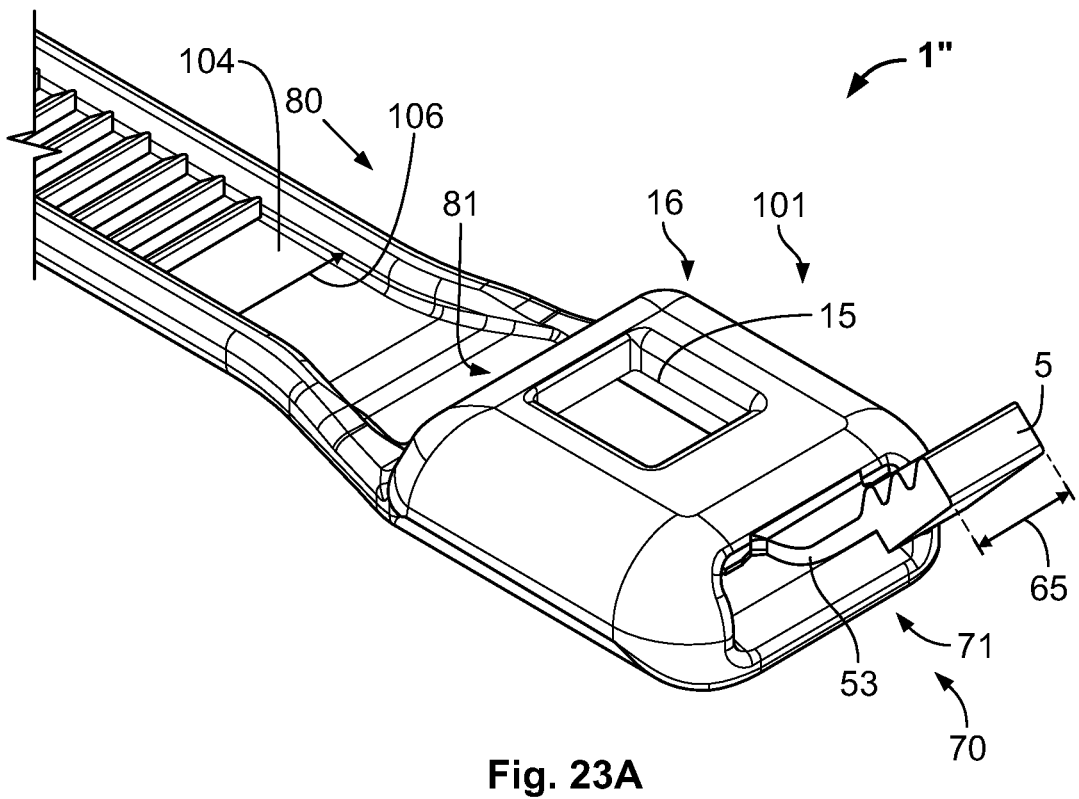
FIG. 23A is a perspective view of a cable tie according to another embodiment of the invention with a lock in an outside position.
Figure 23B:
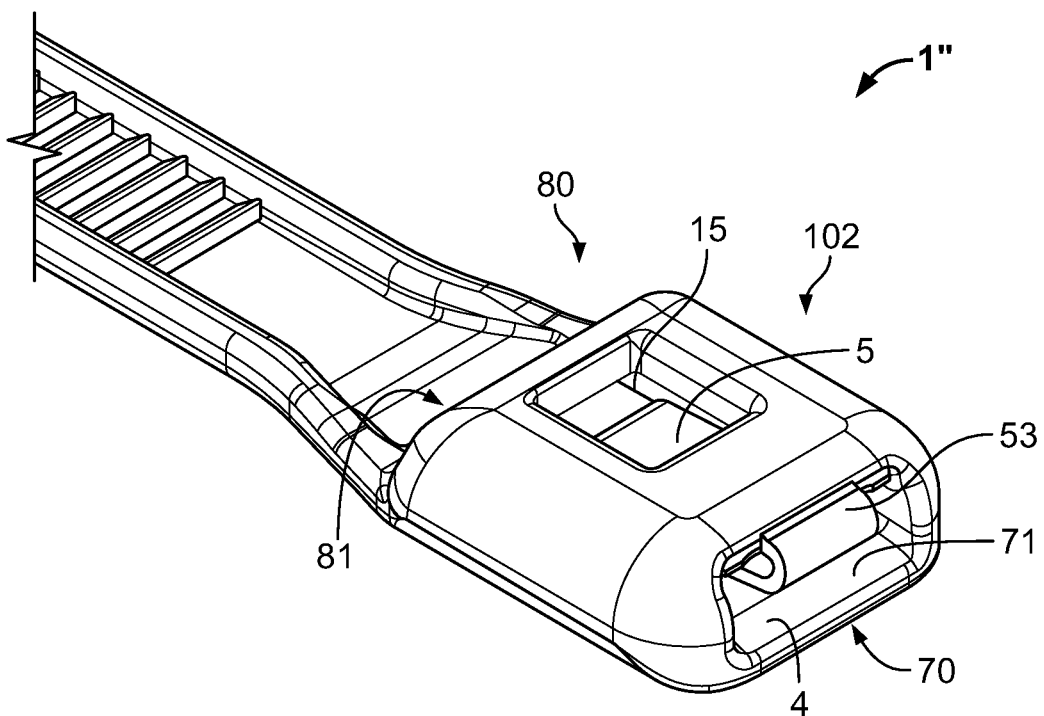
FIG. 23B is a perspective view of the cable tie of FIG. 23A with the lock in an inside position.
Figure 26A:
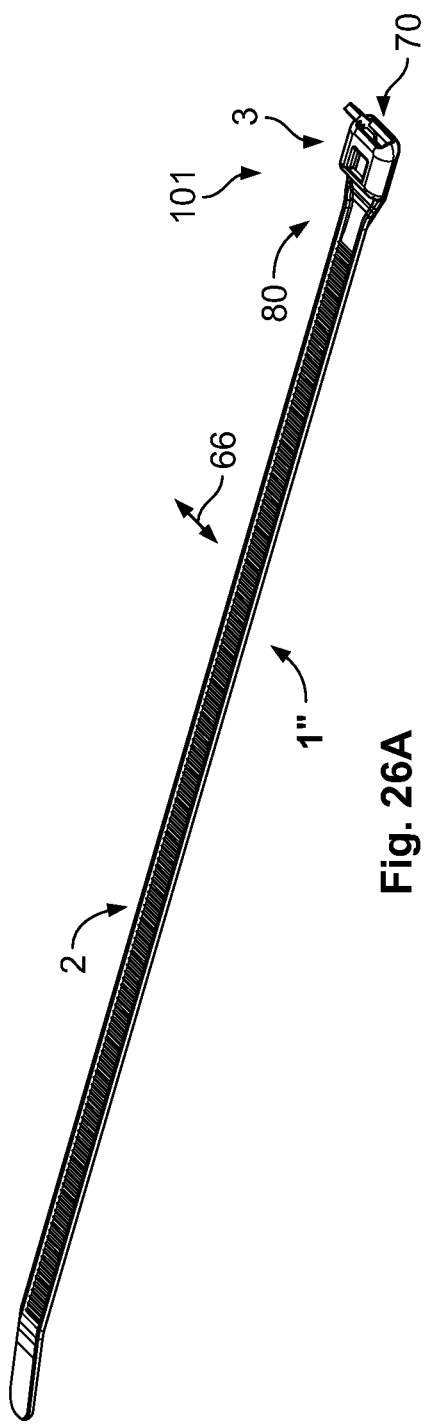
FIG. 26A is a perspective view of the cable tie of FIG. 23A.
Figure 26B:
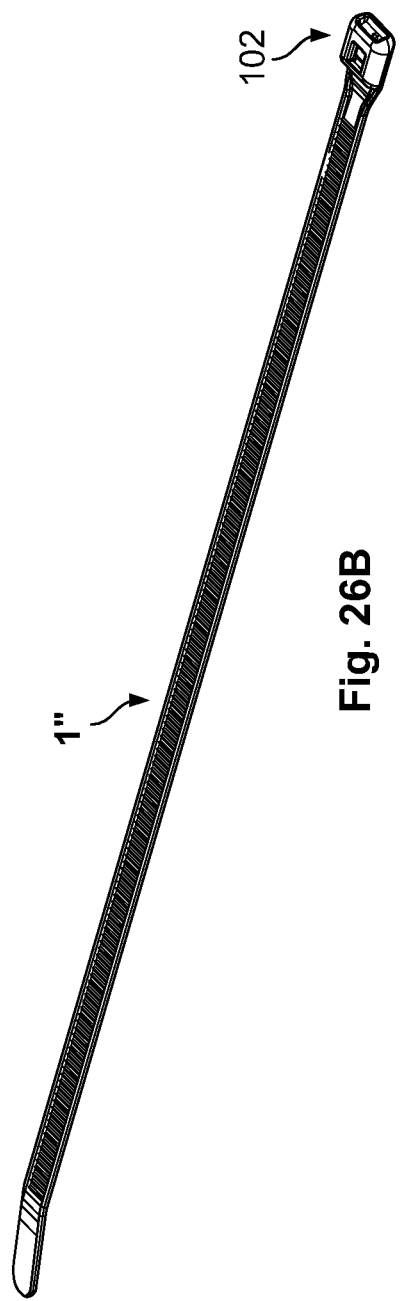
FIG. 26B is a perspective view of the cable tie of FIG. 23B.

The cable tie 1, as shown in FIG. 22, is used to wrap around and secure a plurality of cables 50. As shown in FIG. 22, in comparison to a conventional cable tie 60, the cable tie 1 is significantly flatter.

Figure 14:
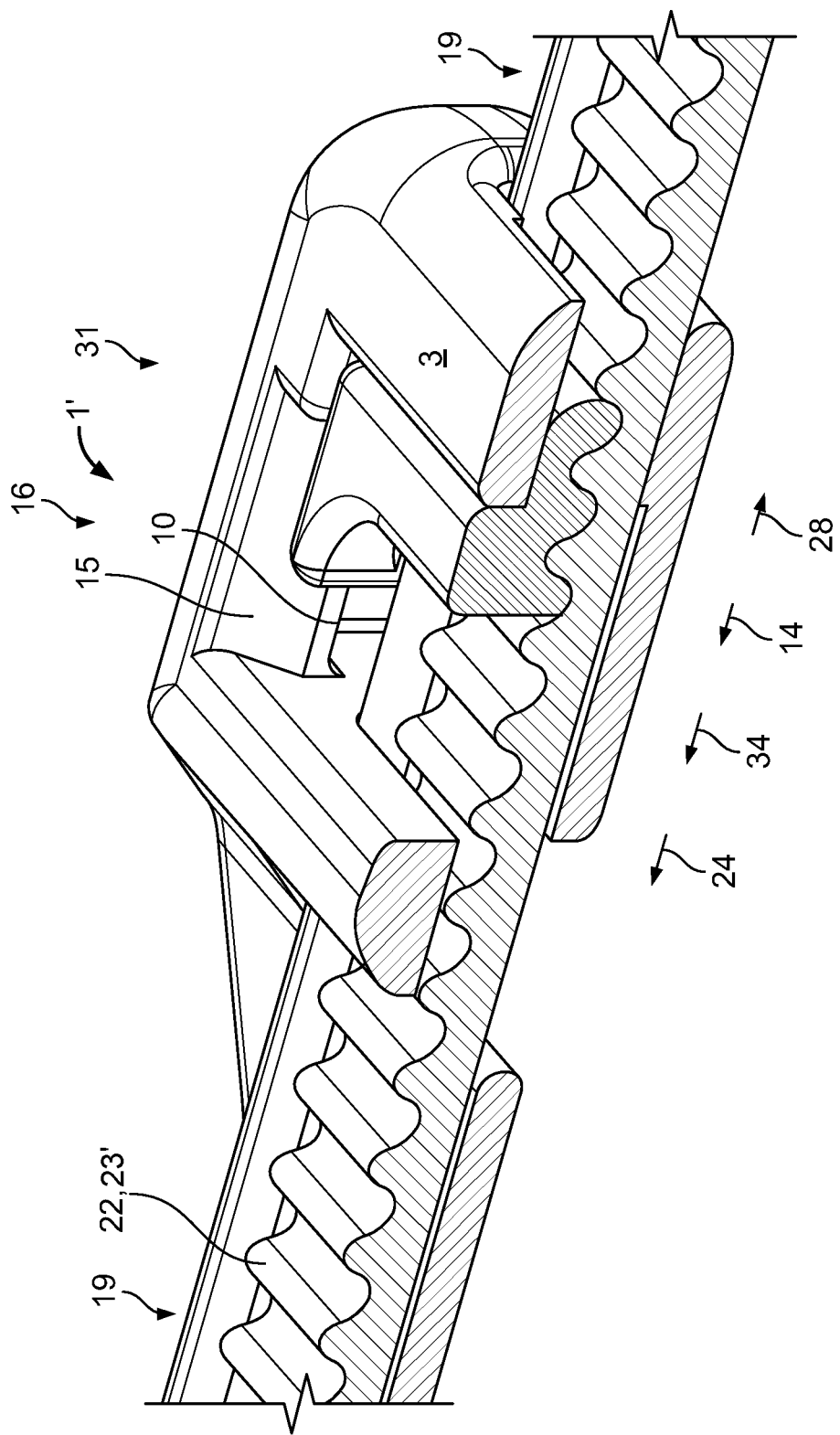
FIG. 14 is a sectional perspective view of the cable tie of FIG. 8.
Figure 15:
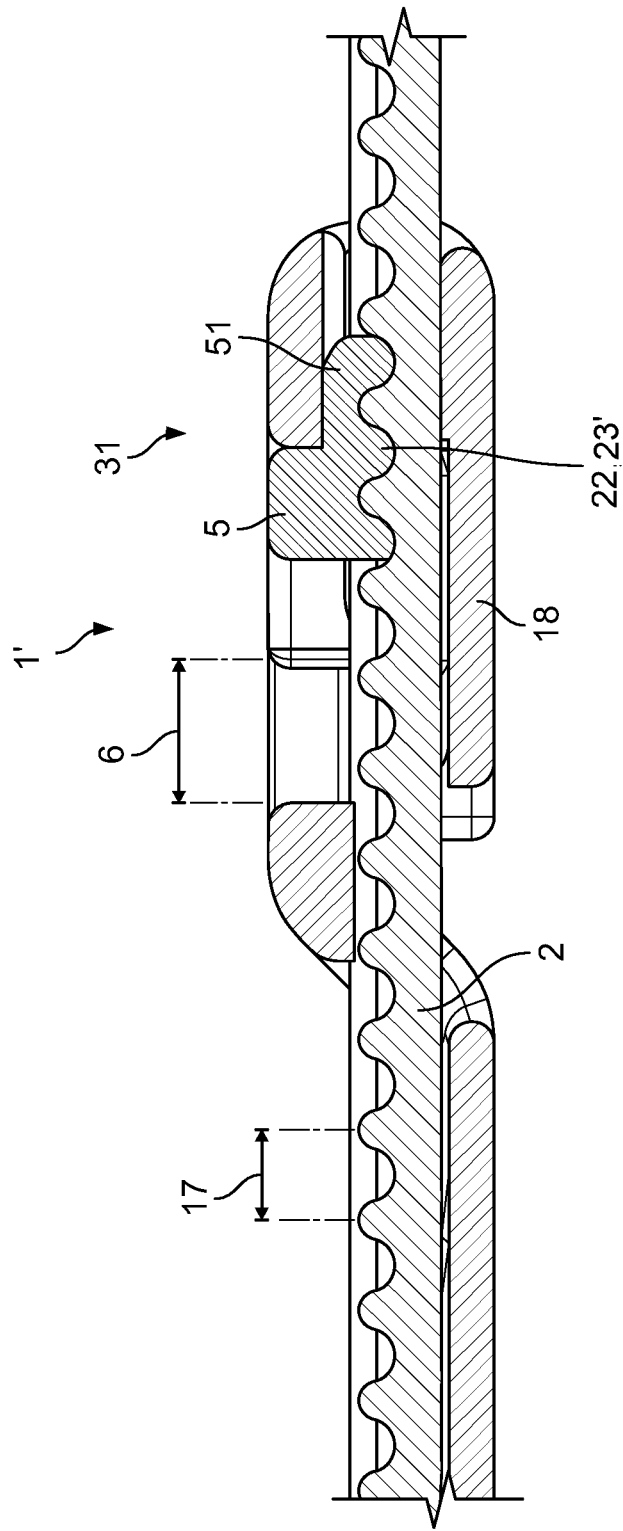
FIG. 15 is a sectional side view of the cable tie of FIG. 8.
Figure 16:
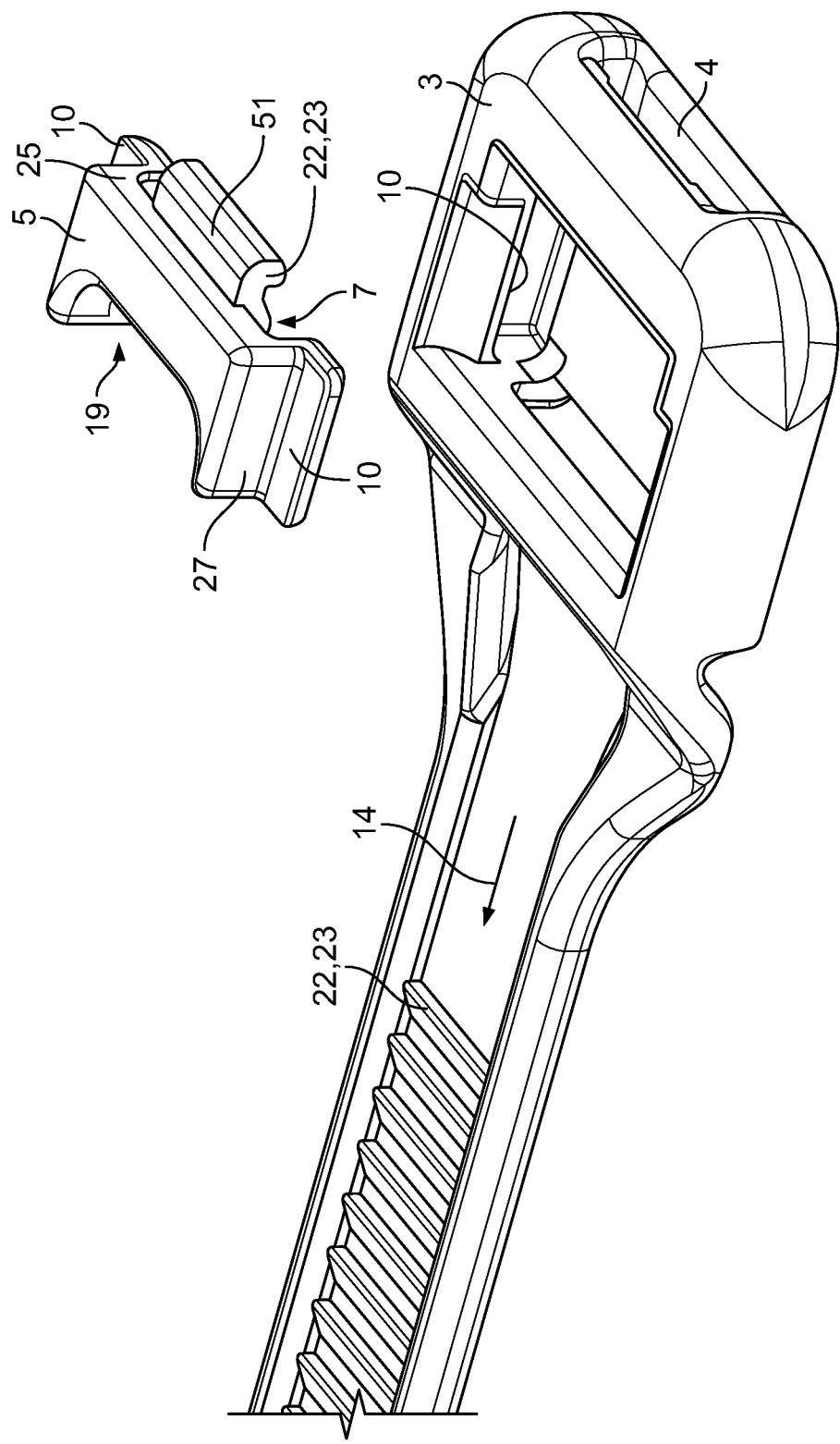
FIG. 16 is a top perspective view of a pre-assembly position of the cable tie of FIG. 1.
Figure 17:
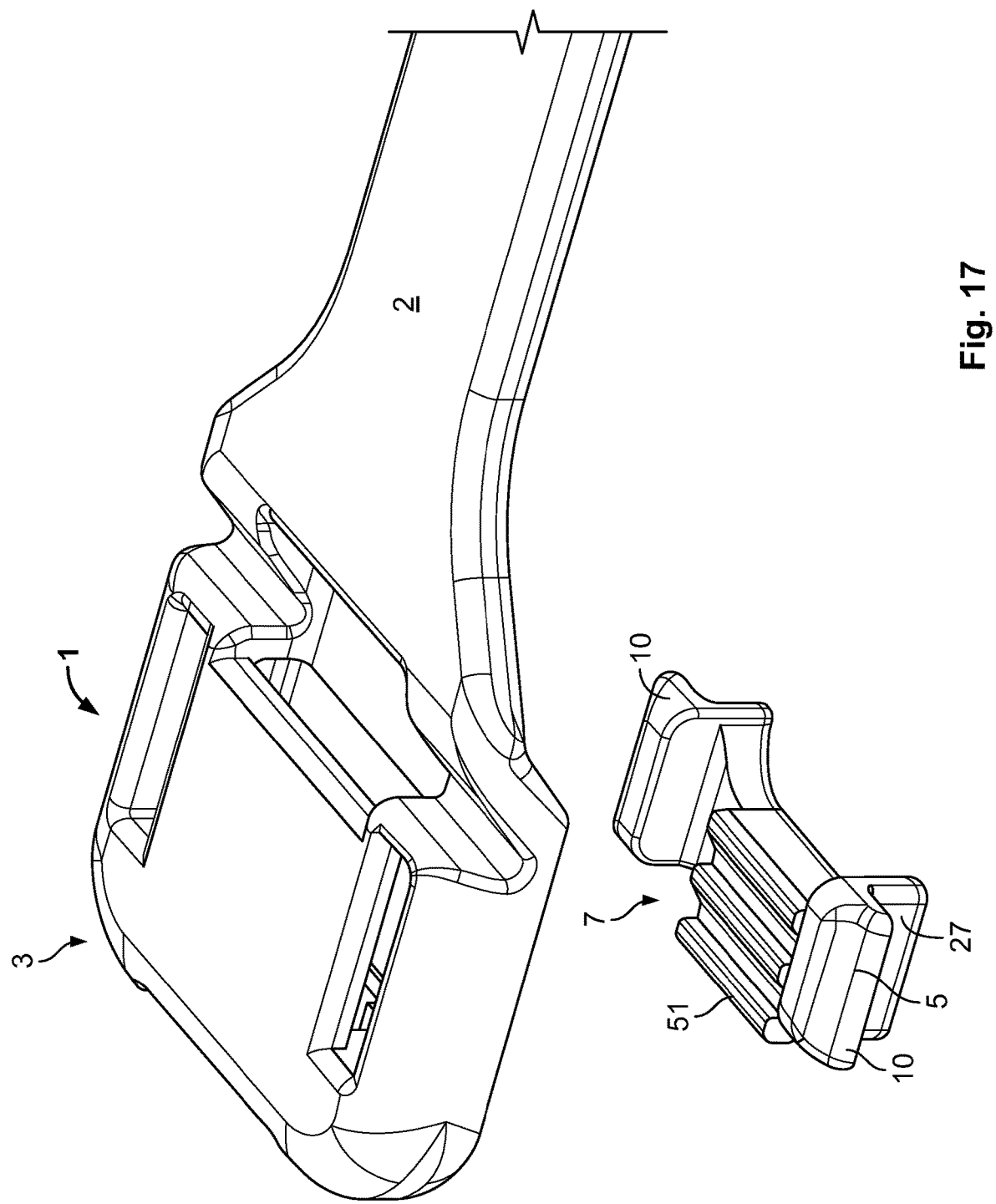
FIG. 17 is a bottom perspective view of the pre-assembly position of the cable tie of FIG. 1.
Figure 18:
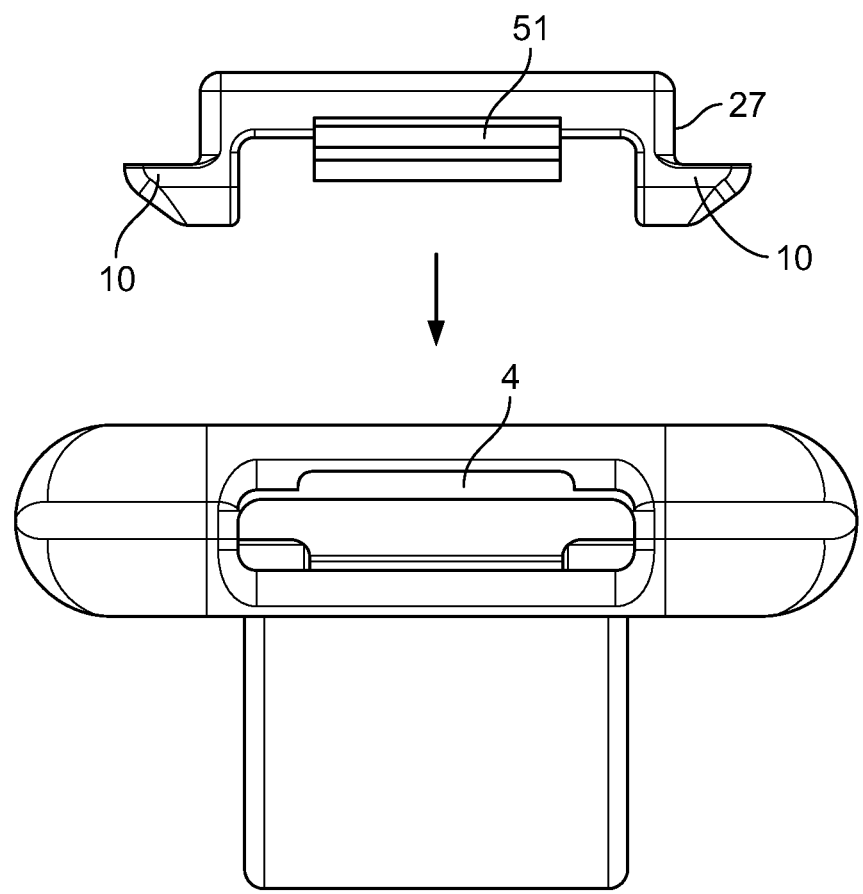
FIG. 18 is a front view of the pre-assembly position of the cable tie of FIG. 1.

A cable tie 1' according to a second embodiment of the invention is shown in FIGS. 8-15. Like reference numerals indicate like elements, and only differences with respect to the first embodiment will be described herein. The cable tie 1' has round teeth 23', shown in FIG. 9, as the positive fit elements 22. The teeth 23' of the lock 5 and the belt 2 are complementary to each other so that a gapless fit between the two is achieved as shown in FIG. 14.

A cable tie 1" according to another embodiment is shown in FIGS. 23A-26B. Like reference numerals indicate like elements, and only differences with respect to the first embodiment will be described herein. The cable tie 1" differs from the cable ties 1, 1' in two aspects. First, the lock 5 is connected to the head 3 by a connection section 53, wherein the connection section 53 is integral with the lock 5 and the head 3. Thus, the entire cable tie 1" is one single element that can, for example, be made by injection molding from a plastic material in a single cavity. Further, the lock 5 cannot be lost and the handling of the cable tie 1" is easier than with separate elements.

The lock 5 can be inserted through a front opening 71 at a front side 70 of the head 3, as shown in FIGS. 23A, 23B, 24A, and 25A-25G. The front side 70 is the side that is opposite a backside 80 at which the belt 2 is located. It is also the side at which the belt 2 is inserted into the head 3. Such a configuration allows to introduce the belt 2 and the lock 5 from the same side so that only access to this front side 70 is necessary; no access from the backside 80 or from the top side 16 is necessary.

The connection section 53 is formed as a belt 52 whose length 45 is slightly less than its width 46 which is measured in a width direction 66 that is perpendicular to the belt direction 24/tightening direction 14 and perpendicular to the height direction 90 or a thickness direction 91 which are both perpendicular to the belt direction 24 or the tightening direction 14, as shown in FIGS. 24A-24G. The width 46 in turn is greater than the height or thickness 49 of the connection section 53. Such a configuration has the advantage that a high degree of flexibility between the head 3 and the lock 5 is achieved in particular relating to a bending or flexing about the width direction 66. The width 46 of the connection section 53 is equal to the width 65 of the lock 5 so that an easy production is possible. The width 46 also corresponds to an inner width 106 of a groove 104 of the belt 2 so that the groove can serve as a guidance for the locking member 5 and the connection section 53.

In the embodiment shown in FIGS. 23A-26B, the thickness or height 95 of the lock 5 is slightly less than the inner height 79 of the front opening 71. The lock 5 can thus be inserted easily. In FIGS. 24A-24G and 26A, the lock 5 is shown in an outside position 101 in which the lock 5 is outside of the front opening 71. In FIGS. 25A-25G and 26B, the lock 5 is shown in an inside position 102 in which the lock 5 has been inserted through and is inside the front opening 71.

As shown in FIGS. 24A and 25A, the connection section 53 has a length 45 that additionally avoids exiting of the lock 5 through the top opening 15 through the top side 16 or the back opening 81, which has the same dimensions as the front opening 71, both being parts of the passageway 4.

In an alternative embodiment, the thickness or height 95 of the lock 5 can be slightly greater than the inner height 79 of the front opening 71. Thus, a slight stretching of the front opening 71 and/or a slight compression of the lock 5 would be necessary when the lock 5 is inserted through the front opening 71 into the head 3. Once the lock 5 is fully inserted in such an embodiment, the stretching and the compression would relax so that the lock 5 can no longer escape through the front opening 71 or the back opening 81.

Once the lock 5 is fully inserted and is thus disposed in the head 3, as shown in FIGS. 25A-25G, the belt 2 is inserted through the front opening 71 into the head 3. The lock 5 is displaceable in the plane 44 of the passageway 4 along the stroke 6 and subsequently perpendicular thereto. It can further be at least partially rotated along a rotation path 58 shown in FIG. 25A. Through this, the belt 2 can be slid through the head 3 for tightening. Once the tightening is completed, protrusions 7, which are again formed as teeth 23, lock the belt 2 in the head 5 when a front stop face 75 on the lock 5 blocks a movement of the lock 5 in the head 3.

The fact that the height 99 of the combination of the belt 2 and the lock 5 is greater than the height 79 of the passageway 4 additionally prevents an exiting of the lock 5 through the front opening 71. It should be noted that the height 99 of the combination of the belt 2 and the lock 5 is not only the sum of the heights 94, 95 of the belt 2 and the lock 5 respectively, but is less than this sum due to the fact that the lock 5 is at least partially complementary and at least partially fits into the groove 104 of the belt 2.

For releasing the cable tie 1, the belt 2 can be pulled further along the belt direction 24 or the tightening direction 14 shown in FIGS. 24A and 25A so that the lock 5 can then be moved away from the belt 2 by an upwards movement and an at least partial rotation along the rotation path 58. This can, for example, be done manually through the top opening 15, for instance by applying a tool like a screw driver. Then, the belt 2 can be pulled out of the head 3 counter to the tightening direction 14 and the belt direction 24.

As before, the head 3 has a base plate 18 so that no access from below is possible and no dirt or contaminations can enter the head 3 from below. The above embodiment would also work without a top opening 15 that is open to an outside. This could further lower the risk of contaminations or dirt entering the head 3.

Figure 27A:
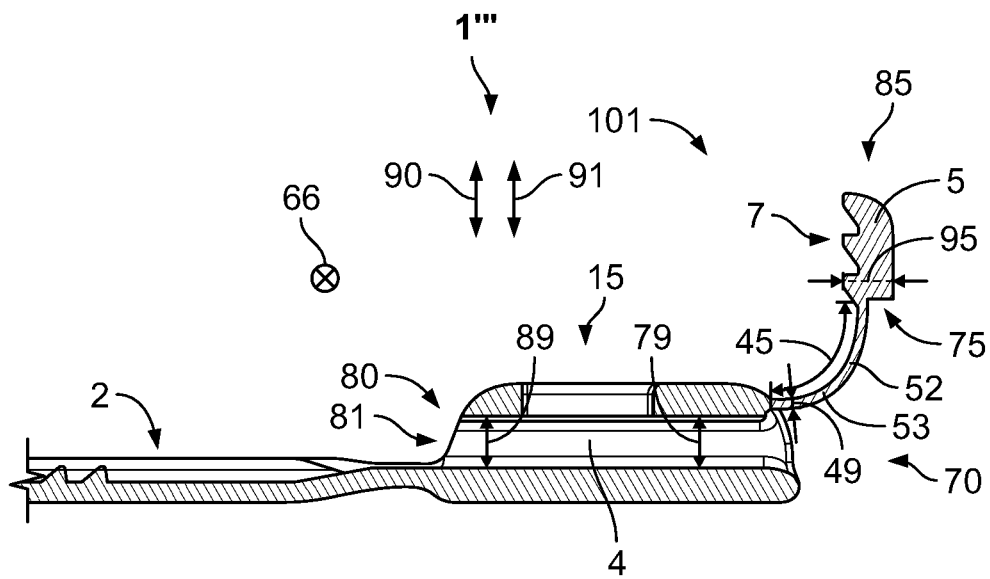
FIG. 27A is a sectional side view of a head of a cable tie according to another embodiment of the invention with a lock in an outside position.
Figure 27B:
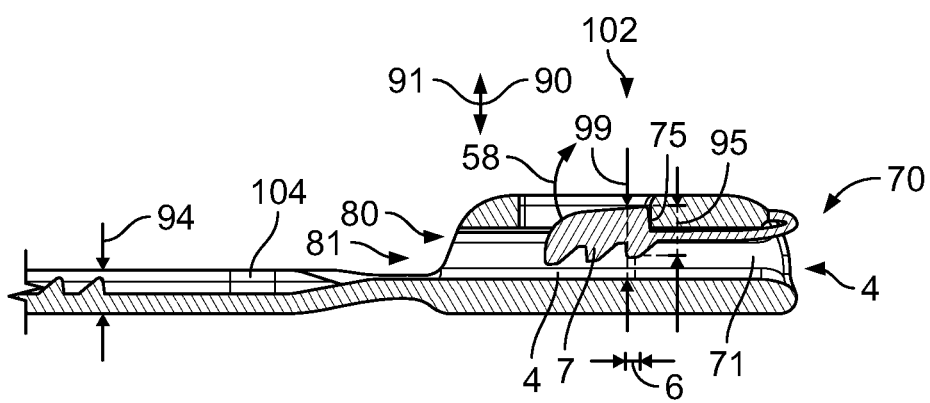
FIG. 27B is a sectional side view of the head of the cable tie of FIG. 27A with the lock in an inside position.

A cable tie 1''' according to another embodiment is shown in FIGS. 27A and 27B. Like reference numerals indicate like elements, and only differences with respect to the first embodiment will be described herein. The cable tie 1''' differs from the cable tie 1" in that the lock 5 is more rounded at the free end at which a back stop face 85 is located. Such a configuration allows a simpler insertion into the front opening 71. Further, the front opening 71 is straight at the end which is different from the slightly funnel-like entry section of the front opening 71 in the embodiment of FIGS. 23A-26B, which facilitates an insertion.

In the cable tie 1" and the cable tie 1''' shown in FIGS. 23A-27B, the connection section 53 protrudes adjacent to the front opening 71 from the front side 70 of the head 3. It protrudes in particular parallel to the belt direction 24 and the tightening direction 14 and parallel to the plane 44 of the passageway 4. This ensures a flat profile of the cable tie 1. The connection section 53 protrudes adjacent to a front stop face 75 of the lock 5 and adjacent to the protrusions 7 from the lock 5 to allow a flat configuration. In the inside position 102, the connection section 53 protrudes parallel to the belt direction 24 and the tightening direction 14 from the lock 5 and runs through the front opening 71.

As shown in FIG. 27B, due to the engagement of the belt 2 and the lock 5 the height 99 of the combination of belt 2 and the lock 5 is less than the sum of the height 95 of the lock 5 and the height 94 of the belt 2. The lock 5 of the embodiment shown in FIGS. 27A and 27B has again a height 95 that is slightly less than the height 79 of the front opening 71 so that this embodiment allows an easy insertion of the lock 5 into the head 3 without exerting stretching or compressing forces. However, when the lock 5 has been inserted in the head 3 and the belt 2 has been inserted subsequently, the height 99 of the combination of the belt 2 and the lock 5 is less than the inner height 79 of the front opening 71, avoiding an exiting of the lock 5 from the head 3.

Advantageously, the cable tie 1, 1', 1", 1''' according to the invention uses little space and has a low profile head 3, consequently, the potential for damage to adjacent substrates and the risk of snagging on adjacent structures is reduced.

What is claimed is:

1. A cable tie, comprising:
   a belt;
   a head connected to the belt and having a passageway for receiving the belt; and
   a lock disposed in the head and displaceable parallel to a plane of the passageway along a stroke, the lock having a protrusion configured to lock the belt, the lock has an extension along a locking direction and the extension is adapted to be pulled below an inner top face of the head so that the protrusion engages a plurality of teeth of the belt.

2. The cable tie of claim 1, wherein the lock is translationally displaceable.

3. The cable tie of claim 2, wherein the lock is displaceable in a longitudinal direction of the belt.

4. The cable tie of claim 1, wherein the head and the lock each have a stop face extending perpendicular to a longitudinal direction of the belt, the stop faces restricting movement of the lock with respect to the head when the cable tie is tightened in a locking direction.

5. The cable tie of claim 1, wherein the head and the lock each have a latch, the latches connecting the lock to the head.

6. The cable tie of claim 1, wherein the lock and the head are made from different materials.

7. The cable tie of claim 1, further comprising a hinge having a weakened region.

8. The cable tie of claim 7, wherein the weakened region is a channel extending perpendicular to a longitudinal direction of the belt.

9. The cable tie of claim 1, wherein the head has a top opening and the lock is accessible from a top side of the head through the top opening.

10. The cable tie of claim 1, wherein the lock has a plurality of protrusions engaging the plurality of teeth.

11. The cable tie of claim 1, wherein the head has a base plate on a side of the passageway opposite the lock.

12. The cable tie of claim 1, wherein the lock and the belt each have guiding faces extending along a longitudinal direction of the belt.

13. The cable tie of claim 1, wherein the head has an inclined output section at an output end of the passageway.

14. The cable tie of claim 1, wherein, in an unlocked position, the belt and the lock overlap at least partially in a direction perpendicular to a longitudinal direction of the belt.

15. The cable tie of claim 1, wherein the head and the lock are integrally connected by a connection section.

16. The cable tie of claim 15, wherein the connection section is formed as a belt.

17. The cable tie of claim 15, wherein the head has a front opening at a front side, the front opening adapted for insertion of the lock through the front opening when the belt is outside the passageway and adapted to block an exiting of the lock through the front opening when the belt is located in the passageway.

18. The cable tie of claim 17, wherein an inner height of the front opening is greater than a height of the lock and less than a combined height of the lock and the belt.

19. The cable tie of claim 17, wherein the connection section protrudes from the front side of the head.

20. The cable tie of claim 19, wherein the connection section protrudes from the head adjacent to the front opening.

21. A cable tie, comprising:
    a belt;
    a head connected to the belt and having a passageway for receiving the belt; and
    a lock disposed in the head and displaceable parallel to a plane of the passageway along a stroke, the lock having a protrusion configured to lock the belt, the head and the lock each have a latch, the latches connecting the lock to the head.

22. A cable tie, comprising:
    a belt;
    a head connected to the belt and having a passageway for receiving the belt; and
    a lock disposed in the head and displaceable parallel to a plane of the passageway along a stroke, the lock having a protrusion configured to lock the belt, the lock and the head are made from different materials.

23. A cable tie, comprising:
    a belt;
    a head connected to the belt and having a passageway for receiving the belt;
    a lock disposed in the head and displaceable parallel to a plane of the passageway along a stroke, the lock having a protrusion configured to lock the belt; and
    a hinge having a weakened region.

24. The cable tie of claim 23, wherein the weakened region is a channel extending perpendicular to a longitudinal direction of the belt.

25. A cable tie, comprising:
    a belt;
    a head connected to the belt and having a passageway for receiving the belt; and
    a lock disposed in the head and displaceable parallel to a plane of the passageway along a stroke, the lock having a protrusion configured to lock the belt, the head has a top opening and the lock is accessible from a top side of the head through the top opening.

26. A cable tie, comprising:
    a belt;
    a head connected to the belt and having a passageway for receiving the belt; and
    a lock disposed in the head and displaceable parallel to a plane of the passageway along a stroke, the lock having a protrusion configured to lock the belt, the head and the lock are integrally connected by a connection section.

27. The cable tie of claim 26, wherein the head has a front opening at a front side, the front opening adapted for insertion of the lock through the front opening when the belt is outside the passageway and adapted to block an exiting of the lock through the front opening when the belt is located in the passageway.

28. The cable tie of claim 27, wherein an inner height of the front opening is greater than a height of the lock and less than a combined height of the lock and the belt.

29. The cable tie of claim 27, wherein the connection section protrudes from the front side of the head.

30. The cable tie of claim 29, wherein the connection section protrudes from the head adjacent to the front opening.

\* \* \* \* \*